US010289430B2

(12) United States Patent
King et al.

(10) Patent No.: US 10,289,430 B2
(45) Date of Patent: May 14, 2019

(54) INTERACTIVE USER INTERFACE FOR METADATA BUILDER

(71) Applicant: CA, Inc., Islandia, NY (US)

(72) Inventors: David Patrick King, Prague (CZ); James Michael Newman, Plano, TX (US)

(73) Assignee: CA, Inc., Islandia, NY (US)

( * ) Notice: Subject to any disclaimer, the term of this patent is extended or adjusted under 35 U.S.C. 154(b) by 194 days.

(21) Appl. No.: 14/223,307

(22) Filed: Mar. 24, 2014

(65) Prior Publication Data
US 2015/0269194 A1    Sep. 24, 2015

(51) Int. Cl.
*G06F 11/36*    (2006.01)
*G06F 9/445*    (2018.01)
*G06F 11/07*    (2006.01)
*G06F 9/451*    (2018.01)
*G06F 9/44*    (2018.01)

(52) U.S. Cl.
CPC ...... *G06F 9/44505* (2013.01); *G06F 11/0706* (2013.01); *G06F 11/0769* (2013.01); *G06F 11/3664* (2013.01); *G06F 9/4443* (2013.01); *G06F 9/451* (2018.02)

(58) Field of Classification Search
CPC .. G06F 11/36–11/3696; G06F 11/3664; G06F 11/30–11/3096; G06F 11/006
USPC ........................................................ 717/125
See application file for complete search history.

(56) References Cited

U.S. PATENT DOCUMENTS

| 6,694,335 | B1* | 2/2004 | Hopmann | G06F 17/30581 |
| | | | | 707/624 |
| 6,714,979 | B1* | 3/2004 | Brandt | H04L 63/166 |
| | | | | 707/999.003 |
| 7,251,808 | B2* | 7/2007 | Bates | G06F 11/3664 |
| | | | | 712/234 |
| 7,533,077 | B2 | 5/2009 | Wang | |
| 7,680,759 | B1* | 3/2010 | Coley | G06F 17/30386 |
| | | | | 707/999.001 |
| 8,015,237 | B2* | 9/2011 | Muller | G06F 17/30017 |
| | | | | 705/51 |

(Continued)

OTHER PUBLICATIONS

ArcGIS, "About validating metadata", downloaded Feb. 4, 2014 from http://help.arcgis.com/en/arcgisdesktop/10.0/help/index.html, 2 pp.

(Continued)

*Primary Examiner* — Robert W Beausoliel, Jr.
*Assistant Examiner* — Nirav K Khakhar
(74) *Attorney, Agent, or Firm* — Sage Patent Group

(57) ABSTRACT

An interactive user interface for a metadata builder is provided by displaying a list of errors in metadata for a computer program and changing the list of errors that is displayed, responsive to receiving a change of the metadata for the computer system and processing the change of the metadata for the computer system. Specifically, an error is added to the list of errors that is displayed and/or is deleted from the list of errors that is displayed. The change of the metadata for the computer system may be an edit of the metadata object, a deletion of the metadata object, a cloning of a metadata object and/or an addition of a new metadata object. Related methods, systems and computer program products are described.

22 Claims, 30 Drawing Sheets

(56) References Cited

U.S. PATENT DOCUMENTS

| | | | |
|---|---|---|---|
| 8,407,437 B1* | 3/2013 | Cheng | G06F 11/108 |
| | | | 711/103 |
| 8,793,223 B1* | 7/2014 | Cho | G06F 11/1076 |
| | | | 707/690 |
| 8,819,068 B1* | 8/2014 | Knote | G06F 17/30339 |
| | | | 707/790 |
| 9,189,875 B2* | 11/2015 | Bultrowicz | G11B 27/034 |
| 2002/0049738 A1* | 4/2002 | Epstein | G06F 17/30997 |
| 2002/0099694 A1* | 7/2002 | Diamond | G06F 17/3002 |
| 2003/0061209 A1* | 3/2003 | Raboczi | G06F 17/30864 |
| 2004/0001408 A1* | 1/2004 | Propps | G11B 20/1883 |
| | | | 369/53.17 |
| 2004/0064825 A1 | 4/2004 | Lim et al. | |
| 2005/0257210 A1 | 11/2005 | Stienhans et al. | |
| 2006/0075387 A1* | 4/2006 | Martin | G06F 8/34 |
| | | | 717/124 |
| 2006/0248123 A1 | 11/2006 | Butash | |
| 2007/0156726 A1* | 7/2007 | Levy | G06F 17/3002 |
| 2008/0195651 A1* | 8/2008 | Rachmiel | G06F 21/604 |
| 2008/0270992 A1 | 10/2008 | Geogieva | |
| 2009/0083295 A1* | 3/2009 | Minamino | G06F 17/30607 |
| 2009/0132950 A1* | 5/2009 | Gibson | G06F 17/2725 |
| | | | 715/780 |
| 2009/0254883 A1* | 10/2009 | Munson | G06F 11/3624 |
| | | | 717/124 |
| 2009/0319365 A1* | 12/2009 | Waggoner | G06F 17/30029 |
| | | | 705/14.41 |
| 2010/0180195 A1 | 7/2010 | Behrens | |
| 2011/0179110 A1* | 7/2011 | Soloway | G06F 17/30292 |
| | | | 709/203 |
| 2012/0089610 A1* | 4/2012 | Agrawal | G06F 17/30286 |
| | | | 707/741 |
| 2013/0185657 A1* | 7/2013 | Gunawardena | G06F 17/30038 |
| | | | 715/753 |
| 2013/0212116 A1* | 8/2013 | Filliettaz, III | G06F 17/30923 |
| | | | 707/755 |
| 2013/0304713 A1* | 11/2013 | Roy-Faderman | G06F 17/30371 |
| | | | 707/702 |
| 2015/0046938 A1* | 2/2015 | Qian | H04N 21/83555 |
| | | | 725/25 |
| 2015/0149876 A1* | 5/2015 | Davis | G06F 17/3089 |
| | | | 715/212 |

OTHER PUBLICATIONS

ArcGIS, "Validate Metadata (Conversion)", downloaded Feb. 4, 2014 from http://help.arcgis.com/en%20/arcgisdesktop/10.0/help/index.html, 3 pp.

ArcGIS, "Validating metadata" downloaded Feb. 4, 2014 from http://help.arcgis.com/en/arcgisdesktop/10.0/help/index.html, 3 pp.

CA Technologies, "CA Chorus™ Software Manager", downloaded Oct. 29, 2013 from http://www.ca.com/us/products/detail/ca-mainframe-software-manager.aspx, 5 pp.

CA Technologies, Product Brief—"CA Chorus™ Software Manager Release 5.1", copyright 2013, 10 pp.

Wikipedia, the free encyclopedia, "Marshalling", downloaded Feb. 4, 2014 from http://en.wikipedia.org/w/index.php?title=Marshalling_(computer_science)&printable=yes, 2 pp.

Wikipedia, the free encyclopedia, "Metadata", downloaded Jan. 29, 2014 from http://en.wikipedia.org/w/index.php?title=Metadata&printable=yes, 12 pp.

JAXB and Marshal/Unmarshal Schema Validation written by Blaise Doughan, Dec. 20, 2010, at http://blog.bdoughan.com/2010/12/jaxb-and-marshalunmarshal-schema.html.

* cited by examiner

Project: DAVE

Configuration: AAAAAAA - 1 - 1 ☆

Product Variables

Parent Group AAAAAA

• Name

• Description

• Tooltip

Include Condition

[ Save ] [ Cancel ]

FIG. 14

Product Variables

Name - You must enter a value.
Tooltip - You must enter a value.
Description - You must enter a value.

Parent Group AAAAAA

❌ Name [ ] You must enter a value.

❌ Description [ ] You must enter a value.

❌ Tooltip [ ] You must enter a value.

Include Condition [INCORRECT TEXT ENTERED HERE] 🔲 ❌

[Save] [Cancel]

FIG. 15

Product Variables

Name - You must enter a value.
Tooltip - You must enter a value.
Description - You must enter a value.

Parent Group AAAAAA

❌ • Name PV_GROUP_TEST

You must enter a value.

❌ • Description This is a test product variable group

You must enter a value.

❌ • Tooltip Hover text for PV group

You must enter a value.

Include Condition $

Save  Cancel

SDV
SEV
$PV
SSV
SSV["Catalog Type"] == "CATALOG"
SEV["CA Chorus Platform"]["DESCRIPTION"] == null
SOPT["OPT_1"]

FIG. 16

Product Variables

Name - You must enter a value.
Tooltip - You must enter a value.
Description - You must enter a value.

Parent Group AAAAAA

❌ • Name [PV_GROUP_TEST]
You must enter a value.

❌ • Description [This is a test product variable group]
You must enter a value.

❌ • Tooltip [Hover text for PV group]
You must enter a value.

Include Condition [sev["CA Chorus Platform"]["DESCRIPTION"] == null]

[Save] [Cancel]

FIG. 17

Product Variables

PV00033: Value of Product Variable Group Include Condition cannot be null or empty.

Parent Group AAAAAAA

- Name PV_GROUP_TEST
- Description This is a test product variable group
- Tooltip Hover text for PV Group

Include Condition $EV["CA Chorus Platform"]["DESCRIPTION"] == null

[Save] [Cancel]

Product Variables

ERROR in input: 'incorrect' FOUND: 'incorrect' POSITION: 9 EXPECTED: '$OPT', '$OPT', '$ST', '$EV', '$PV', '$DV', '$SV', '('

Parent Group PV_GROUP_TEST

* Name PV_FCR_GROUP_TEST

* Description Product Variable in PV_GROUP_TEST

* Tooltip PV_GROUP_TEST PV

Long Description

❌ Include incorrect text
Condition

Domain MIXEDCASETEXT ▼ ● MANDATORY ○ OPTIONAL

Default Value Max Length 1

Default Set by

Fixed Value ☐ User Must Verify ☐ Hidden ☐

Expression Type ▼

[Save] [Cancel]

FIG. 22

Product Variables

Symbol condition is not allowed in this place.

Parent Group PV_GROUP_TEST

• Name PV_FOR_GROUP_TEST

• Description Product Variable in PV_GROUP_TEST

• Tooltip PV_GROUP_TEST PV

Long Description

⊗ Include Condition SST["@StandardSymbolTable@"]["@StandardSYSRES@"] != null

Domain MIXEDCASETEXT ▾ ● MANDATORY ○ OPTIONAL

Default Value [ ] Max Length 1

Default Set by

Fixed Value ☐ User Must Verify ○ Hidden ☐

Expression Type [ ▾ ]

[Save] [Cancel]

Product Variables

| The Permitted Text must match with the Maxlength Field |

Parent Group PV_GROUP_TEST
      • Name PV_FOR_GROUP_TEST
      • Description Product Variable in PV_GROUP_TEST

• Tooltip PV_GROUP_TEST PV

Long Description

Include Condition $OPT("OPT_1")

Domain MIXEDCASETEXT      ⊙ MANDATORY ○ OPTIONAL
      Default Value ASDDFDF      Max Length 1
      Default Set by Environment - ENF - STARTCOMMAND
      Fixed Value ☑    User Must Verify ☑    Hidden ☑

Expression Type     PERMITTED VALUE LIST ▼

— PERMITTED VALUE LIST —

REMOVE PERMITTED VALUE LIST ✖

Permitted Value Type        Text Value ▼

— Text Value —
Text Value       XYZ

[ADD]

| PERMITTED TEXT | Regular Expression | Text Value | DELETE |
|---|---|---|---|
| noDataAvailable | | | |

[Save] [Cancel]

FIG. 26

MVS Data Set Form

- Name: RES_A1

Data Set ●   Temporary ○   Dummy ○

☐ Runtime Resource

Data Set Name: AAAA
DSNTYPE: HFS
LIKE:

LIKE must reference a catalogued data set. Avoid referencing deployment data sets as they can be deployed to uncatalogued locations.

── Allocation Data ──────────────────────────
                                    There is no DCB ↔

There is no space ↔

── Unit/Volume/SMS/Label ────────────────────

INTERACTIVE USER INTERFACE FOR METADATA BUILDER

BACKGROUND

Various embodiments described herein relate to computer systems, methods and programs, and more particularly to systems, methods and computer programs that provide metadata for a computer program.

Metadata is "data about data". In the context a computer program, metadata may be used to describe the content of the computer program using a given metadata standard.

Metadata itself is data that can be stored and managed in a database, often called a "metadata registry" or "metadata repository". Metadata is generally structured according to a standardized context using a well defined metadata schema. The metadata schema may contain the rules created to structure the fields or elements of metadata. The metadata schema may be expressed in a mark-up or programming language, such as Extensible Markup Language (XML). Metadata schema can be hierarchical in nature, where relationships exist between metadata elements, and elements are nested so that parent-child relationships exist between the elements. Thus, metadata may be expressed in a hierarchical object-oriented structure.

As the complexity of computer programs increase, the complexity of the metadata thereof may also increase. For example, an enterprise computer program, also referred to as a mainframe computer program, may contain hundreds of thousands of lines of associated metadata. A specific example will now be provided relative to mainframe computer programs marketed by CA, Inc. ("CA"), the assignee of the present application.

Specifically, CA mainframe computer programs generally require metadata that CA Mainframe Software Manager (CA MSM), now known as CA Chorus™ Software Manager (CA CSM), uses to configure the program after installation and deployment. The metadata is written in XML using an XML editor. The metadata must be error-free, complete, and must conform to a metadata schema that is specified by CA CSM Software Configuration Service (SCS).

Unfortunately, a mainframe computer program may include on the order of 150,000 lines of XML metadata. It is, therefore, difficult and time consuming to design metadata that is error-free and complete using an XML editor.

BRIEF SUMMARY

Various embodiments described herein can provide an interactive user interface for a metadata builder by displaying on an image on a display screen, a list of errors in metadata for a computer program and changing the list of errors that is displayed on the image of the display screen, responsive to receiving a change of the metadata for the computer system and processing the change of the metadata for the computer system. In some embodiments, the changing comprises adding an error to the list of errors that is displayed on the image of the display screen and/or deleting an error from the list of errors that is displayed on the image of the display screen responsive to the receiving a change of the metadata for the computer system and the processing the change of the metadata for the computer system.

In some embodiments, the metadata comprises metadata objects and the change of the metadata for the computer system may comprise an edit of the metadata object, a deletion of the metadata object, a cloning of a metadata object and/or an addition of a new metadata object.

Moreover, in some embodiments, the displaying a list of errors in the metadata can comprise displaying a list of logical validation errors that identify violations of referential integrity in the metadata, and displaying a list of schema validation errors in the metadata that identify semantic and syntactic violations of the schema in the metadata. The displaying a list of errors may further comprise displaying a list of warnings about the metadata and displaying informational messages about the metadata.

In other embodiments, in addition to displaying a list of errors in the metadata, the displaying may further comprise displaying on the image of the display screen, a hierarchical tree of the metadata objects including nodes that represent classes of metadata objects, and displaying on the image of the display screen a list of the metadata objects for a given node among the nodes of the hierarchical tree responsive to receiving a selection of the given node. In other embodiments, the displaying may further comprise displaying details of a given metadata object among the metadata objects responsive to receiving a selection of the given metadata object. The displaying the details may comprise replacing the list of the metadata objects for the given node of the hierarchical tree with a form on the image of the display screen that comprises the details of the given metadata object responsive to receiving the selection of the given metadata object. In other embodiments, the displaying may further comprise displaying an XML fragment of the given metadata object in a pop up window on the image of the display screen responsive to receiving a selection of the given metadata object. In still other embodiments, the displaying may still further comprise displaying details of a child metadata object of the given metadata object responsive to receiving a selection of the given metadata object. The details of a given metadata object may comprise prerequisites that are needed for the given metadata object and a list of child metadata objects of the given metadata object.

In still other embodiments, the list of the metadata objects of a given node may be reordered responsive to receiving a reordering instruction. In some embodiments, the reordering may comprise moving a group of the metadata objects in the list responsive to receiving a selection of the group of the metadata objects and further responsive to receiving the reordering instruction.

Yet other embodiments may further comprise replacing the list of the metadata objects for the given node among the nodes of the hierarchical tree with a form for adding a new metadata object to the metadata objects, responsive to receiving a selection, for example of an add icon, on the list of the metadata objects. Moreover, in these embodiments, the processing of the change of the metadata for the computer system may comprise identifying required fields that are missing from the form and identifying text that is erroneously entered on the form. Moreover, the changing the list of errors may comprise changing the list of errors that is displayed on the image of the display screen to delete errors in the metadata that are corrected by the new metadata object and/or to add errors in the metadata that are generated by the new metadata object.

In still other embodiments, the list of the metadata objects for the given node among the nodes of the hierarchical tree may be replaced with a form for editing a given metadata object among the metadata objects, deleting a given metadata object among the metadata objects and/or cloning a given metadata object among the metadata objects, responsive to receiving selection of the given metadata object on the list of the metadata objects for editing, deleting and/or cloning, respectively.

It will be understood that various embodiments have been described above in connection with methods of operating a computer system. However, various other embodiments described herein can provide analogous computer systems and computer programs.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 5-6, 7A-7C, 8-23, 24A, 24B, 25A, 25B and 26-31 are screen shots of an interactive user interface according to various embodiments described herein.

DETAILED DESCRIPTION

Various embodiments described herein can provide a MetaData Builder (MDB) that allows metadata to be built by the way of two-way user interaction, that can generate metadata that is complete and error-free. As was noted above, a mainframe computer program may include on the order of 150,000 lines of XML metadata. It may be difficult to provide complete and error-free XML data of this magnitude using an XML editor.

Various embodiments will be described herein in connection with specific CA mainframe computer programs. However, various embodiments described herein may be used with mainframe computer programs that are distributed by other organizations and/or for other computer programs, such as enterprise, application, personal, pervasive and/or embedded computer programs.

Figure 1:
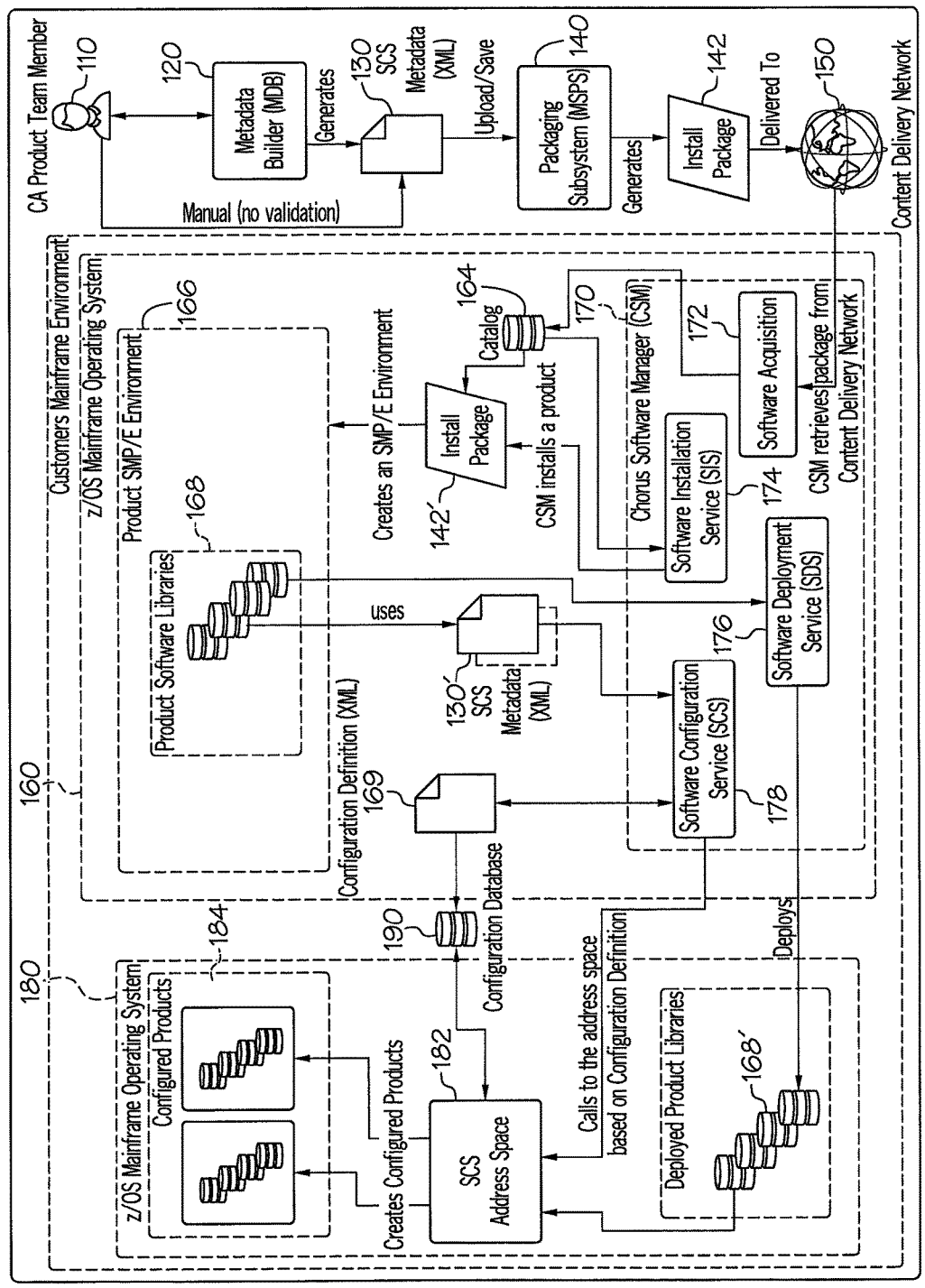
FIG. 1 is a block diagram of a computer program development and use environment according to various embodiments described herein.

FIG. 1 is a block diagram of a computer program (also referred to herein as "a computer program product" or simply as a "product") development and use environment according to various embodiments described herein.

Referring to FIG. 1, a metadata developer, such as a CA Product Team Member 110 at a user terminal, interacts with a MetaData Builder (MDB) 120 according to various embodiments described herein, to produce XML Software Configuration Services (SCS) metadata 130. The SCS metadata 130 is then packaged with a CA product by a packaging subsystem 140, and the resulting install package 142 is distributed to the customer using a content delivery network, such as the CA Content Delivery Network 150.

In the customer's mainframe environment 160, Chorus Software Manager (CSM) 170 uses its Software Acquisition component 172 to retrieve the install package 142 from the Content Delivery Network 150. The install package 142' is then stored as information in a Catalog database 164. The CSM 170 Software Installation Service (SIS) 174 uses a product's associated Install Package 142' located in the Catalog database 164 to create an SMP/E Environment 166. Each SMP/E Environment 166 contains a set of software libraries 168 associated with the installed product. The CSM 170 Software Deployment Service (SDS) 176 transmits a copy of the Product Software Libraries 168' to the mainframe system where the deployed product is to be configured 180.

The SCS metadata 130' which was created by the MDB 120 and is included within one or more of the installed Product Software Libraries 168 is used by the Chorus Software Manager (CSM) 170 Software Configuration Services (SCS) 178 to create a Configuration Definition 169. A Configuration database 190 is updated with the resulting Configuration Definition 169.

The CSM 170 SCS 178 interacts with the SCS Address Space 182 running on a z/OS Mainframe 180 where the deployed Product Libraries 168' are accessed to create a configured instance of the product 184. SCS 178 interacts with the SCS Address Space 182 to orchestrate the implementation of a set of configuration operations defined in the constructed Configuration Definition 169. Each SCS Configured Product 184 is constructed using its associated SCS Metadata 130 that was created and generated by the MDB 120.

It will be understood that any of the blocks of FIG. 1 including the MDB 120, packaging subsystem 140, content delivery network 150 and the customer's mainframe environment 160, and/or any combination or subcombination of the blocks of FIG. 1, may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable media.

Figure 2:
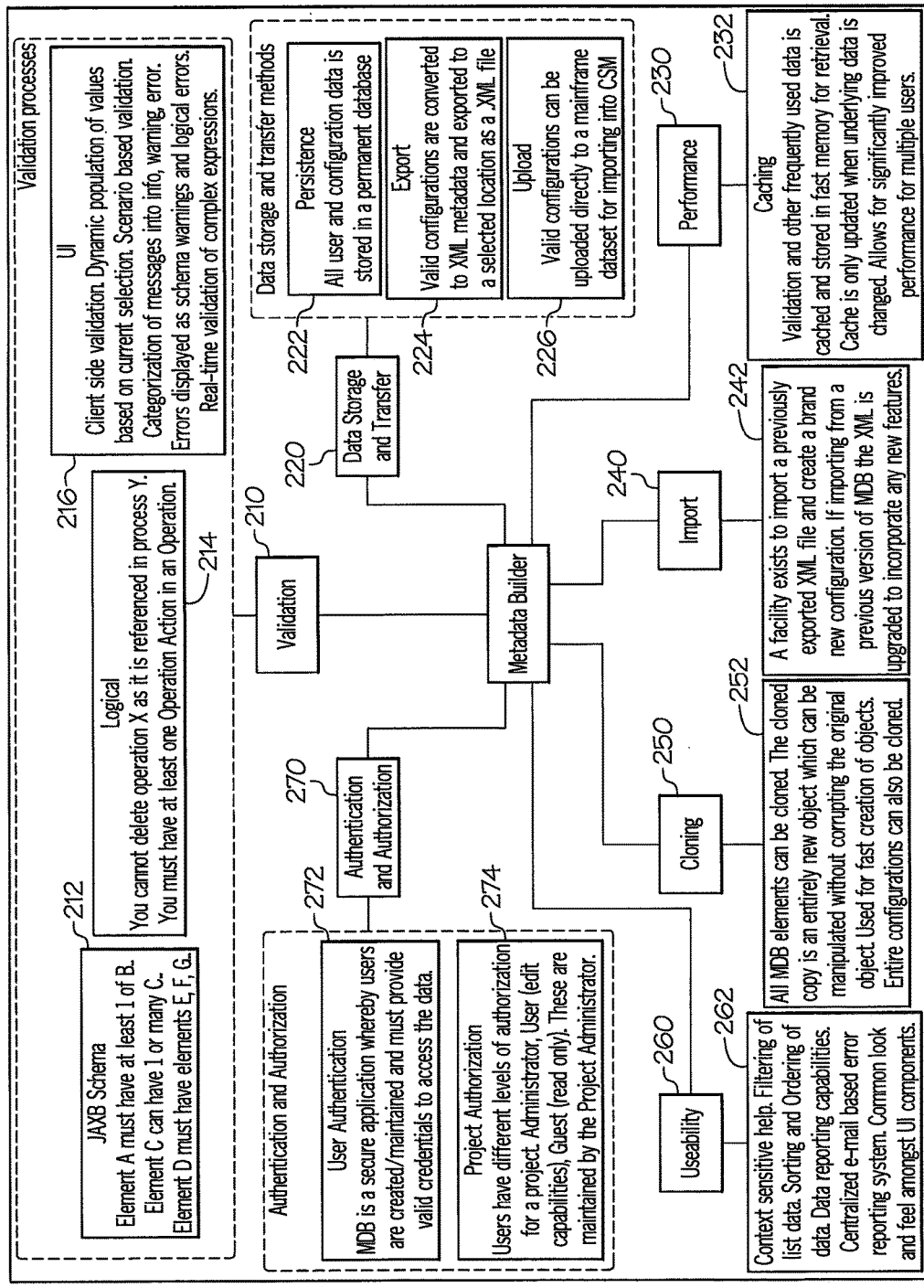
FIG. 2 is a block diagram of a metadata builder according to various embodiments described herein.

FIG. 2 is a block diagram of a metadata builder according to various embodiments described herein, which may correspond to the MDB 120 of FIG. 1. The MDB 120 includes a validation system 210, a data storage and transfer system 220, a performance system 230, an importing system 240, a cloning system 250, a usability system 260 and an authentication and authorization system 270.

The authentication and authorization system 270 provides user authentication (Block 272) and also allows different levels of authorization for the project (Block 274), so that, for example, one user may have write access, while other users may have read access. The validation system 210 provides schema validation 212, logical validation 214 and a User Interface (UI) 216 that provides interactive metadata creation. The data storage and transfer system 220 allows persistent storage of configuration data as it is created (Block 222), allows exporting of valid configurations (Block 224) and uploading of the valid configuration to CSM (Block 226). The performance system 230 provides caching (Block 232) of validated and frequently used data to allow improved performance with multiple users. The importing system 240 provides a facility to import a previously exported XML metadata set and create a new configuration (Block 242). The cloning system 250 allows new data objects to be cloned from existing data objects (Block 252). Finally, the usability function 260 provides context-sensitive help and other usability functions (Block 262).

The information pertaining to a CA product which can be deployed on a mainframe by CA Chorus™ Software Manager (CSM) is contained in metadata in XML format. This metadata is constructed by means of a user interface application called CA Chorus™ Software Manager SCS Meta-Data Builder (MDB). The metadata can also be constructed externally to MDB. In the MDB application, the metadata is stored in data objects known as "configurations". The creation of a configuration is an iterative process through which the user is guided by various validation and messaging techniques. When a configuration is complete (contains no errors) it can be exported to an external file for storage on a file system or uploaded directly to a mainframe for storage within a data set.

Various embodiments of schema validation 212 are described in application Ser. No. 14/223,440, entitled "Schema Validation for Metadata Builder", filed concurrently herewith, the disclosure of which is hereby incorporated herein by reference in its entirety as if set forth fully herein. Various embodiments of importing 240 are described in application Ser. No. 14/223,260, entitled "Importing Metadata Into Metadata Builder", filed concurrently herewith, the disclosure of which is hereby incorporated herein by reference in its entirety as if set forth fully herein. Various embodiments of a user interface 216 are described in the present application. Finally, various embodiments of logical validation 214 are described in application Ser. No. 14/223,379, entitled "Logical Validation for Metadata Builder", filed concurrently herewith, the disclosure of which is hereby incorporated herein by reference in its entirety as if set forth fully herein.

Interactive User Interface—High Level Description

The present embodiments provide a two-way interactive user interface for a metadata builder as illustrated, for example, in Block 216 of FIG. 2. In general, a user may select a given metadata object, which may be a Java object, and provide input to dynamically populate values for the metadata object that is currently selected. The values are validated against the metadata schema and for logical consistency. Thus, user selection of metadata object values produces user error messages regarding schema warnings and/or logical errors. The user responds to these messages by creating additional metadata objects and values, which may eliminate some error messages, but may add others. This interactive process can continue until the error messages are eliminated. Moreover, during the interactive process, XML statements may be built on the fly and validated as the values are entered by the user.

According to various embodiments described herein, a user may be guided through each step of the metadata creation process by providing intuitive error messaging and information displays. Moreover, in some embodiments, incorrect values may not be permitted, so that the metadata may be in a stable state. In some embodiments, validation may be "on the fly", meaning that the input is validated as the user is typing. The metadata may grow as each step is completed, and the snapshot of the metadata may be viewed at any time. This snapshot may also provide detailed information about missing or incorrect data, in some embodiments, down to line level detail. Only validated metadata may be exported for use by the Mainframe Software Manager, such as the Chorus Software Manager (CSM) 170 of FIG. 1.

In some embodiments, Java® Server Faces (JSF) may be used as the UI technology backed by the Java language and a web application running in a Tomcat server environment. Information is displayed to the user about what details need to be input to create a configuration that can be used to create metadata for use by a mainframe software manager to configure a mainframe product. The use of UI components can guide as well as inform the user as to the progress of their metadata. Error and information messages, context-sensitive help and other UI features provided by the JSF framework can make the process interactive rather than a "submit and wait" operation.

An interactive user interface such as the interactive user interface 216 of FIG. 2, according to various embodiments described herein, may provide server side validation, for example using the logical validation function 214 and/or the schema validation function 212 of FIG. 2. Moreover, client side validation may also be provided by the interactive user interface itself, to correct minor errors in the metadata that is input by a user, without requiring full sever side logical and/or schema validation. For example, static rules, such as missing field rules may be flagged as an error by the user interface itself, without requiring server side validation. Moreover, caching also may be used to provide dynamic population of values based on a current user selection, so that the server need not be called every time a change to the metadata is made by the user. Scenario-based validation may also be provided by the specific type of object which is being edited, deleted or created. For example, an operation may require one or more operation actions. Operation actions can be one of twenty nine service request descriptor types. All operation actions may be processed by a common set of validation rules but each sub type may have its own set of rules which can be applied to that and only that type of service request descriptor type. Manipulation of these actions/service request descriptor types may have the same starting UI display screens and validation, but as the process gets more specific to each type, the UI and/or the validation rules may change. The end result will be a valid operation action but the steps it takes to get to this point may vary depending on the specific service request descriptor type selected by the user.

Messages may be categorized into informational messages, warning messages and error messages. For example, error messages may be displayed as schema validation warnings and logical validation errors. Moreover, real time validation of complex expressions may also be provided.

Interactive User Interface—Intermediate Level Description

Figure 3:
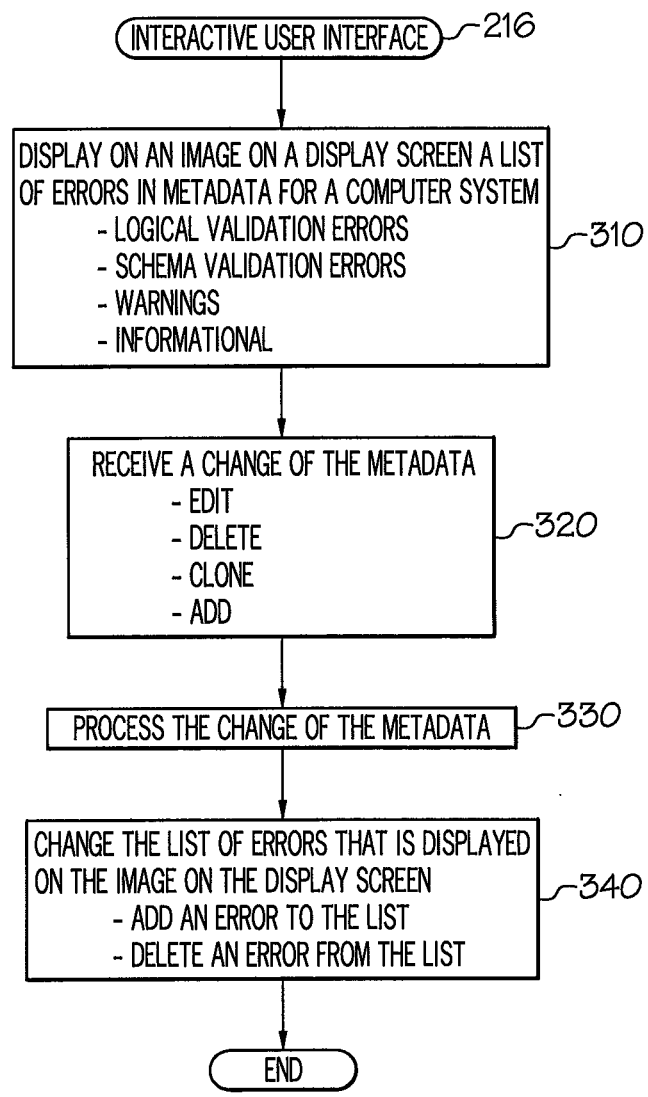
FIGS. 3, 4A and 4B are flowcharts of operations that may be performed by an interactive user interface according to various embodiments described herein.

FIG. 3 is a flowchart of operations that may be performed to provide an interactive user interface, such as the interactive user interface 216 of FIG. 2, according to various embodiments described herein. Referring now to FIG. 3, at Block 310, a list of errors in the metadata for a computer system is displayed on an image on a display screen. The list of errors may include logical validation errors, schema validation errors, warnings and/or informational messages.

As used herein, logical validation is used to check for referential integrity of the metadata. For example, the metadata may conform to schema validation values, but while syntactically correct, the output might not function as expected when deployed to a mainframe. Logical validation ensures that the content of the data, not just the structure, is correct. As used herein, "referential integrity" is a property of data which, when satisfied, requires every value of one attribute of a relation to exist as a value of another attribute in a different or the same relation. Thus, for example, for referential integrity to hold in the metadata builder application, ID references are used to infer the relationships. Any object which is referenced in another object by the use of an ID reference cannot be deleted as long as one or more references to the object exists elsewhere in the configuration object hierarchy. Moreover, in some cases, the original object cannot be altered if there are any references to this object as the data content is dependent on the original object state. Various embodiments of logical validation are described in the above-cited application Ser. No. 14/223, 376.

Moreover, as used herein, schema validation errors refer to errors in the metadata that identify semantic and syntactic violations in the metadata. In general, for a configuration metadata object to be considered valid, it must be both semantically and syntactically correct. Schema validation can perform operations to ensure that the candidate configuration is semantically and syntactically correct. Semantic validation may be performed, for example, by running the candidate configuration object through a series of business object rules, to ensure the content of the metadata is valid. Syntactic validation provides a comparison of the marshalled configuration metadata against an abstract representation of the metadata, known as a "schema definition". As used herein, "marshalling" means an operation, such as provided by a Java programming language, to convert a Java object into an XML object. Various embodiments of schema validation are described in the above-cited application Ser. No. 14/223,440.

Warnings are messages that do not indicate a specific error, such that the metadata cannot be validated unless the warning is eliminated. Rather, warnings provide information to a user to proceed with caution, but will not stop the validation. Finally, informational messages are messages that can relay important information to the user regarding the current data view. The data content is correct in its current state but the information is there to possibly influence the user to alter the data and/or as a reminder that more content should be provided elsewhere. The user can however, safely ignore the information message.

Still referring to FIG. 3, at Block 320, a change of the metadata is received, for example from a user 110 of the metadata builder. These changes can comprise instructions to edit a metadata object, delete a metadata object, clone a metadata object and/or add a new metadata object. As used herein, cloning is an operation that can replicate a metadata object and then modify the replicated data object to provide a similar metadata object as the original metadata object. Thus, the original metadata object can serve as a template for the cloned metadata object. The cloned copies an entirely new object that can be manipulated without corrupting the original object, as was described for example at Block 252 of FIG. 2. In contrast, adding creates a new metadata object without being cloned from an existing metadata object.

Still referring to FIG. 3, at Block 330, the change of the metadata is processed. The change in the metadata may be processed by the user interface itself, to identify minor errors in the metadata. This may referred to herein as "client side processing". In contrast, major errors in the metadata may be identified at the server by invoking the schema validation function 212, the logical validation function 214, the cloning function 250 and/or other functions of FIG. 2 outside the user interface 216. For example, a change in a given metadata object that is provided by a user may be processed at the server to identify errors in other metadata objects that are caused by the change of a given metadata object. Thus, the entire configuration, including the change, may be revalidated at the server. In other embodiments, some revalidation of the entire metadata configuration may also be performed at the client side.

Finally, referring to Block 340, the list of errors that is displayed on the image on the display screen at Block 310 is changed responsive to receiving the change of the metadata for the computer system at Block 320 and further responsive to the processing of the change of the metadata for the computer system at Block 330. As also illustrated at Block 340, the changing may comprise adding one or more errors to the list of the errors that is displayed on the image on the display screen and/or deleting one or more errors from the list of errors that is displayed on the image on the display screen.

Figure 4A:
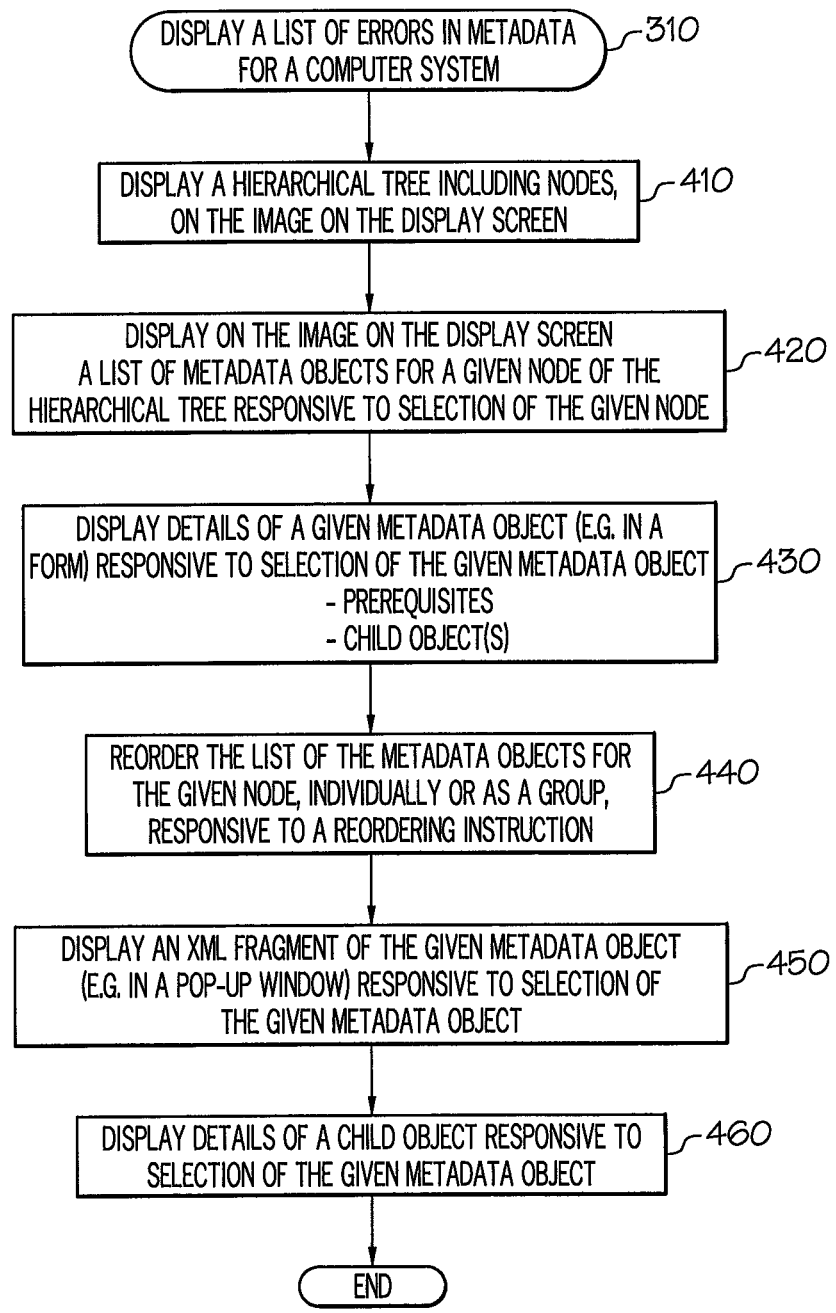

FIG. 4A is a flowchart of further operations that may be performed to display on an image on a display screen, a list of errors in metadata for a computer system, which may correspond to the operations of Block 310 of FIG. 3.

Referring to FIG. 4A, at Block 410, a hierarchical tree of the metadata objects may be displayed on the image on the display screen of a user terminal, such as the user terminal of the CA product team member 110 of FIG. 1. The hierarchical tree includes nodes that represent classes of metadata objects. Moreover, at Block 420, a list of metadata objects for a given node among the nodes of the hierarchical tree is also displayed on the image on the display screen at Block 410, responsive to receiving a selection of the given node. Thus, a hierarchical tree and a listing of metadata objects for a given node may be simultaneously displayed on the image on the display screen. Specific examples will be provided below.

Optionally, at Block 430, details of a given metadata object among the metadata objects may be displayed, for example, in a read-only form on the image on the display screen that replaces the list of the list of the metadata objects for the given node of the hierarchical tree, responsive to selection of the given metadata object. These details may include prerequisites that are needed for the given metadata object and/or a list of child object(s) of the given metadata object.

Alternatively, or in addition, at Block 440, the list of the metadata objects for the given node may be reordered responsive to receiving a reordering instruction. The reordering may take place individually or as a group. Reordering may be performed because the metadata may be executed in the order in which it is contained in a configuration. Thus, a user may wish to reorder a metadata object and/or a group of metadata objects, so that they are executed prior to or after other metadata objects.

At Block 450, in addition or alternatively, an XML fragment of the given metadata object among the metadata objects may be displayed, for example in a pop-up window on the image on the display screen, responsive to the receiving a selection of the given metadata object. Finally, at Block 460, optionally, details of a child object of a given object may be displayed responsive to receiving a selection of the given metadata object.

Figure 4B:
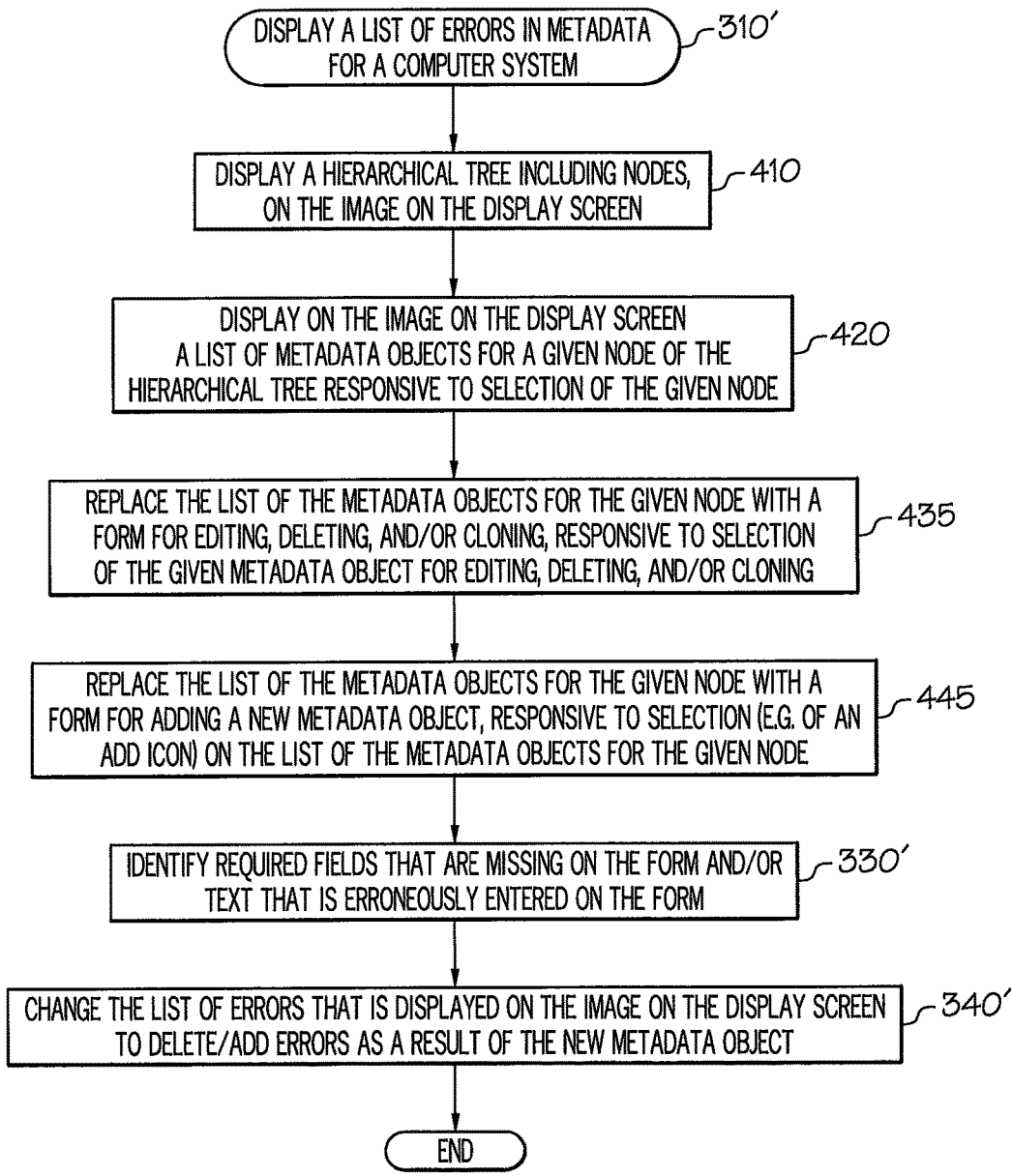

FIG. 4B is a flowchart of other operations 310' that may be performed to display a list of errors in metadata for a computer system, which may be performed in addition to or instead of the operations of FIG. 4A.

Referring to FIG. 4B, at Block 410, a hierarchical tree is displayed on the image on the display screen. The hierarchical tree includes nodes that represent classes of metadata objects. At Block 420, a list of the metadata objects for a given node among the nodes is displayed on the image on the display screen, responsive to receiving a selection of the given node.

At Block 435, the list of the metadata objects for the given node among the nodes of the hierarchical tree is replaced with a form for editing a given metadata object among the data objects, deleting a metadata object among the metadata objects and/or cloning a metadata object among the metadata objects, responsive to receiving selection of the given metadata object on the list of the metadata objects for editing, deleting and/or cloning, respectively.

Alternatively, at Block 445, the list of the metadata objects for the given node among the nodes of the hierarchical tree is replaced with a form for adding a new metadata object to the metadata objects, responsive to receiving a selection of, for example, an add icon or other user indication, on the list of the metadata objects.

According to embodiments of FIG. 4B, processing 330' may be performed to identify required fields that are missing on the form and/or to identify text that is erroneously entered on the form. Block 330' may provide embodiments of client side validation that validates the user entries for the new object itself, but which may not validate the entire configuration based on the new object.

At Block 340', further processing may be performed to validate the configuration based on the newly added metadata object. This may provide an embodiment of server side validation where the configuration, including the newly added metadata object, is revalidated. As illustrated at Block 340', the list of errors that is displayed on the image on the display screen is then changed to delete the errors in the metadata that are corrected by the new metadata object and/or to add errors in the metadata that are generated by the new metadata object.

Interactive User Interface—Low Level Description

A low level description of an interactive user interface according to various embodiments described herein, will now be provided. This description will be provided by way of specific screen shots that may be used to provide an interactive user interface according to various embodiments described herein. These screen shots will provide specific examples of the operations of FIGS. 3, 4A and 4B, as described below. These examples shall be regarded as merely illustrative and shall not be construed as limiting the invention.

Figure 5:
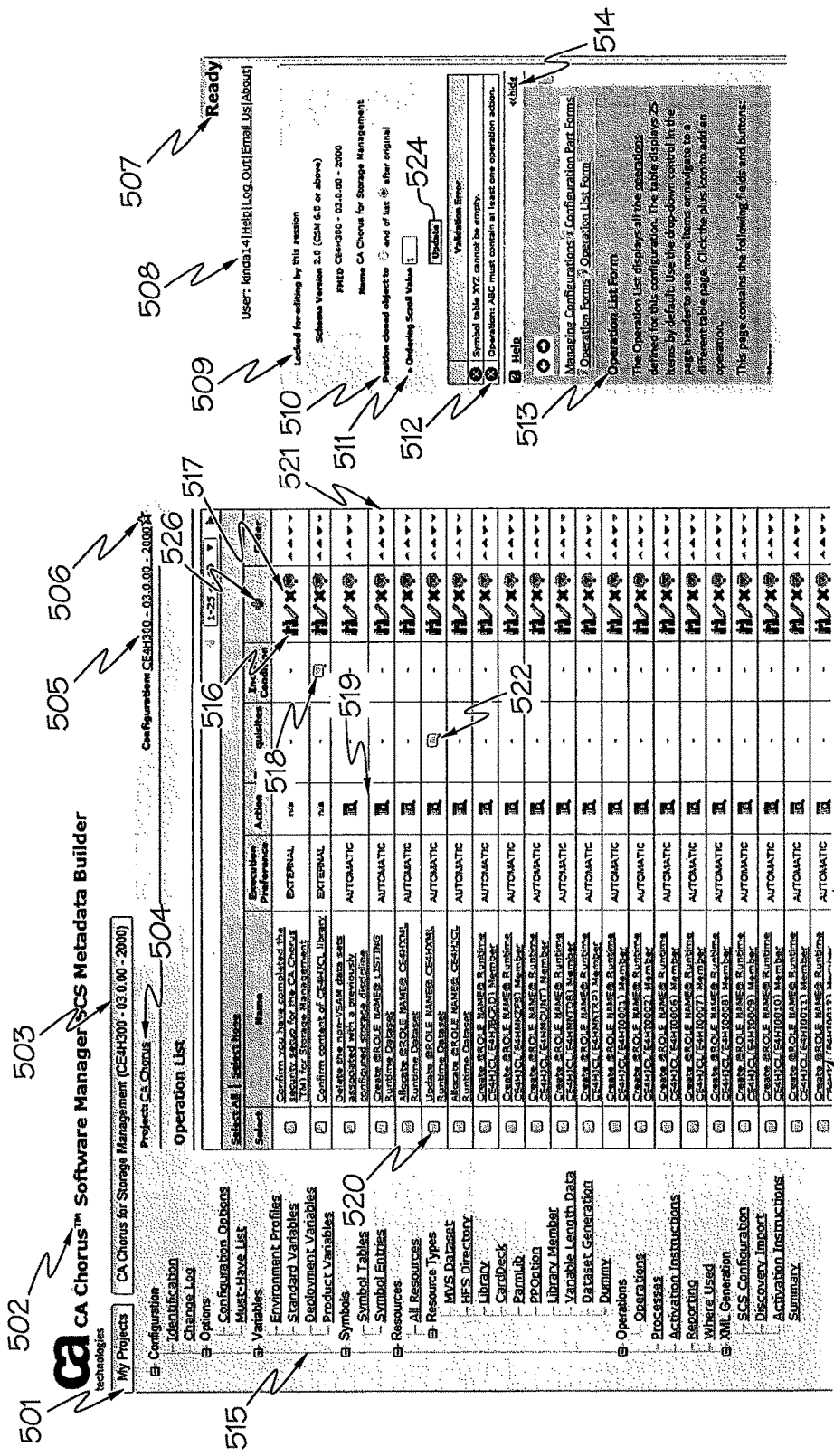

FIG. 5 is a screen shot of an interactive user interface according to various embodiments described herein. FIG. 5 may be displayed in a single image on a display of a user display device. The display image of FIG. 5 may be used to present configuration options and/or forms for editing the data content of the objects. The display image of FIG. 5 may be configured to allow the user to perform as many functions as possible without the need to switch between images, while also not unduly cluttering up the image. In general, the left hand side of the image provides a hierarchy of metadata objects and a list of metadata objects or a form for changing a metadata object, while the right side of the image provides a list of errors in the metadata.

Specifically, referring to FIG. 5, reference number 501 illustrates a tab, which, when clicked, can return the user to the main entry image, which may list all projects. Reference number 502 provides application heading information. Reference number 503 illustrates open configuration settings. Clicking on this tab will switch to the configuration. Reference number 504 illustrates the parent object for this configuration. Clicking on this link will redirect the user to a list of configurations in a given project. Reference number 505 indicates the current configuration information. Clicking on this link will redirect the user to a configuration information form, where details about this configuration can be edited.

Continuing with the description of FIG. 5, reference number 506 indicates a starred configuration. When configurations are starred, they are marked as "favorite" items. Favorite items may be listed in main project screens, which can allow the user fast access to the configuration. Starred items may be marked in one way, for example with a gold star, whereas unstarred items may be marked in another way, such as by a gray star.

Reference number 507 provides a "Ready" indicator. In some embodiments, certain operations may take a few seconds or more to complete, for example to provide logical and/or schema validation of changed metadata. When an operation of this type is being executed, a "Please Wait" message may be displayed at 507, essentially locking out the application. When the operation is complete, the "Ready" indicator may be displayed at 507.

Figure 6:
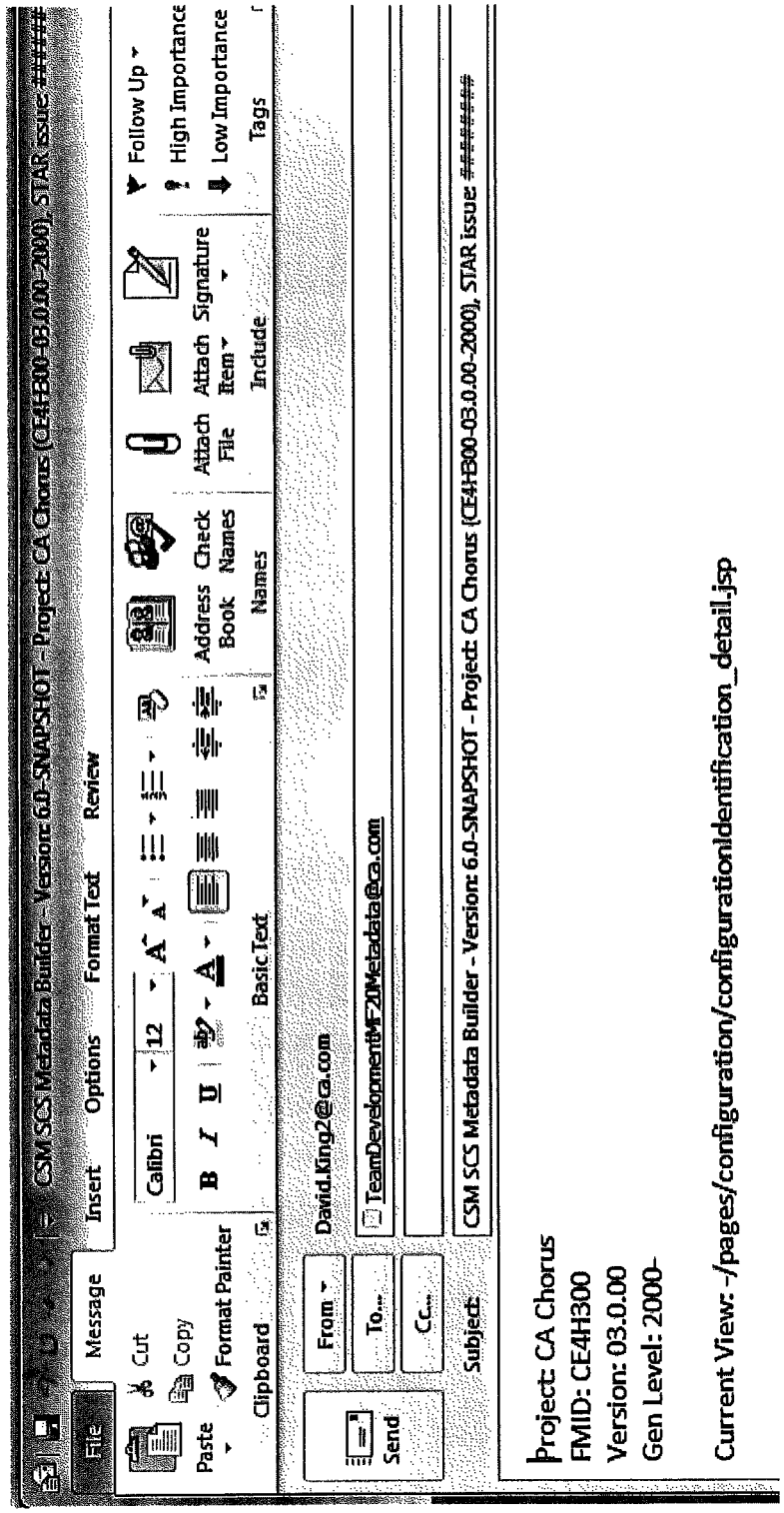

The quick link bar 508 allows a user to perform various tasks. For example, the user can see who is currently logged on (user ID), go to the main help page and/or log out of the application. Moreover, in the event of an error in the metadata builder application, clicking on this link will open an email message which is pre-populated with information relating to the current configuration and view. An example of such an email message is illustrated in FIG. 6. Finally, clicking on a link in the quick link bar 508 may also display detailed version information about the metadata builder application.

Reference number 509 indicates an area that is reserved for configuration information. For example, when a user is viewing a locked configuration, i.e. a configuration that is being edited by another user, the locking user's ID is displayed. Moreover, metadata objects can utilize a cloning feature to create new objects. The placing of the cloned objects can be at the point of cloning or at the end of the list. The option can be changed at reference number 510, without the need to go to a settings page.

Reordering information may be provided at reference number 511, pursuant to Block 440 of FIG. 4A. Listed elements can be ordered singly or in groups. Ordering in groups may be provided by selecting one or more check boxes at reference number 520. The selection can be moved up or down a number of rows based on the value that is provided at reference number 511.

Still referring to FIG. 5, reference number 512 displays a list of errors in the metadata for a computer program, which may correspond to Block 310 of FIGS. 3 and 4A, or Block 310' of FIG. 4B. Schema and/or logical validation errors for the configuration are displayed at reference number 512. The list is dynamic, so that as errors are corrected they are removed from the list. Similarly, when a new object is created, it may have missing elements. These missing elements will also be displayed at reference number 512. As was noted above in connection with Block 310 of FIG. 3, the errors may include logical validation errors and/or schema validation errors, and may also contain warnings and/or informational messages. In other embodiments, warnings or other information messages may be displayed elsewhere.

Context-sensitive help is displayed in the panel 513. In some embodiments, each page of the metadata builder may have its own context-sensitive help, where information about the operation of the screen, the components and/or their usage are explained. The help panel can be collapsed and/or hidden by selecting the link at 514.

The left side of the screen of FIG. 5 can display other information that was described in connection with FIGS. 4A and 4B, which may allow the user to quickly navigate around the entire configuration structure. Any tree node can be accessed from any form or list.

Specifically, reference number 515 illustrates the display on the image on the display screen of a hierarchical tree of the metadata objects including nodes that represent classes of metadata objects as was described, for example, at Block 410 of FIGS. 4A and 4B. As shown, the hierarchical tree has, as a highest level, a "configuration" object, and includes object classes for "options", "variables", "symbols", "resources", "operations" and "XML generation". Child objects of these objects are also displayed in the hierarchy 515. Moreover, as shown at 525, in response to selection of a given node of the hierarchical tree, such as the "operations" node, a list of the metadata objects for the given node is also displayed on the image on the display screen, as was described at Block 420 of FIGS. 4A and 4B.

Figure 7A:
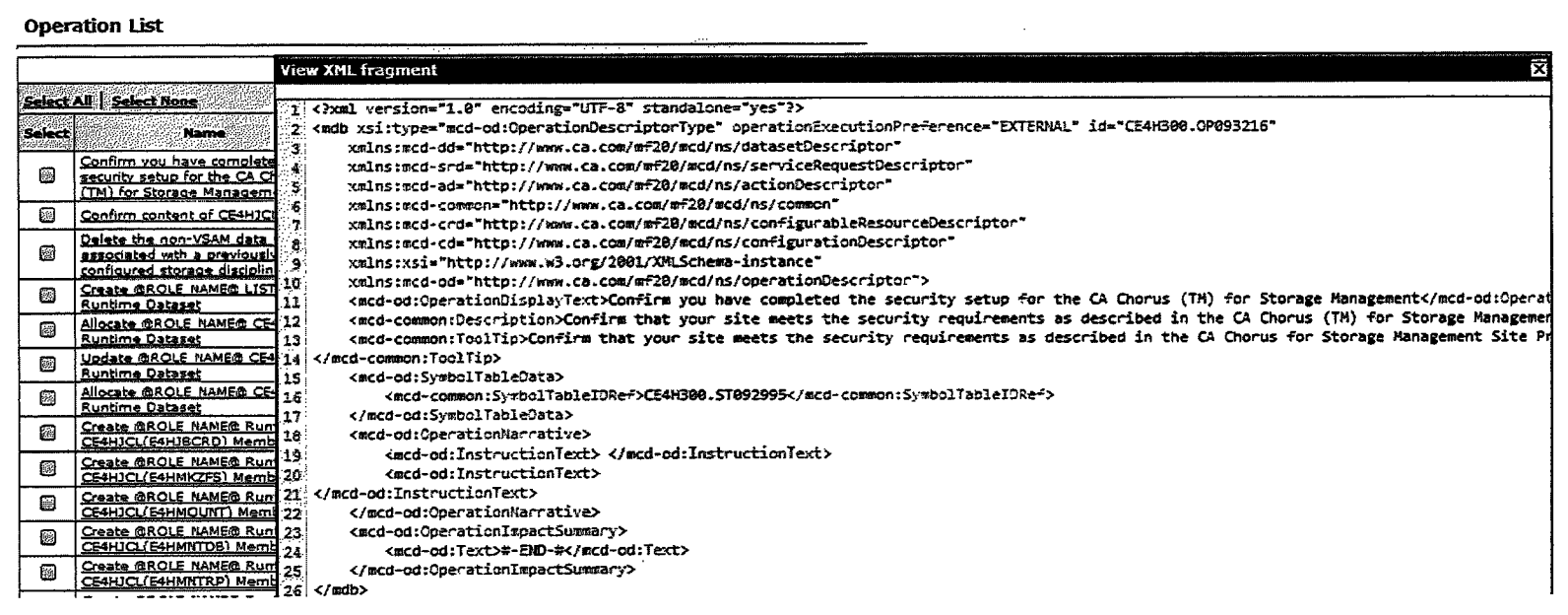
Figure 7B:
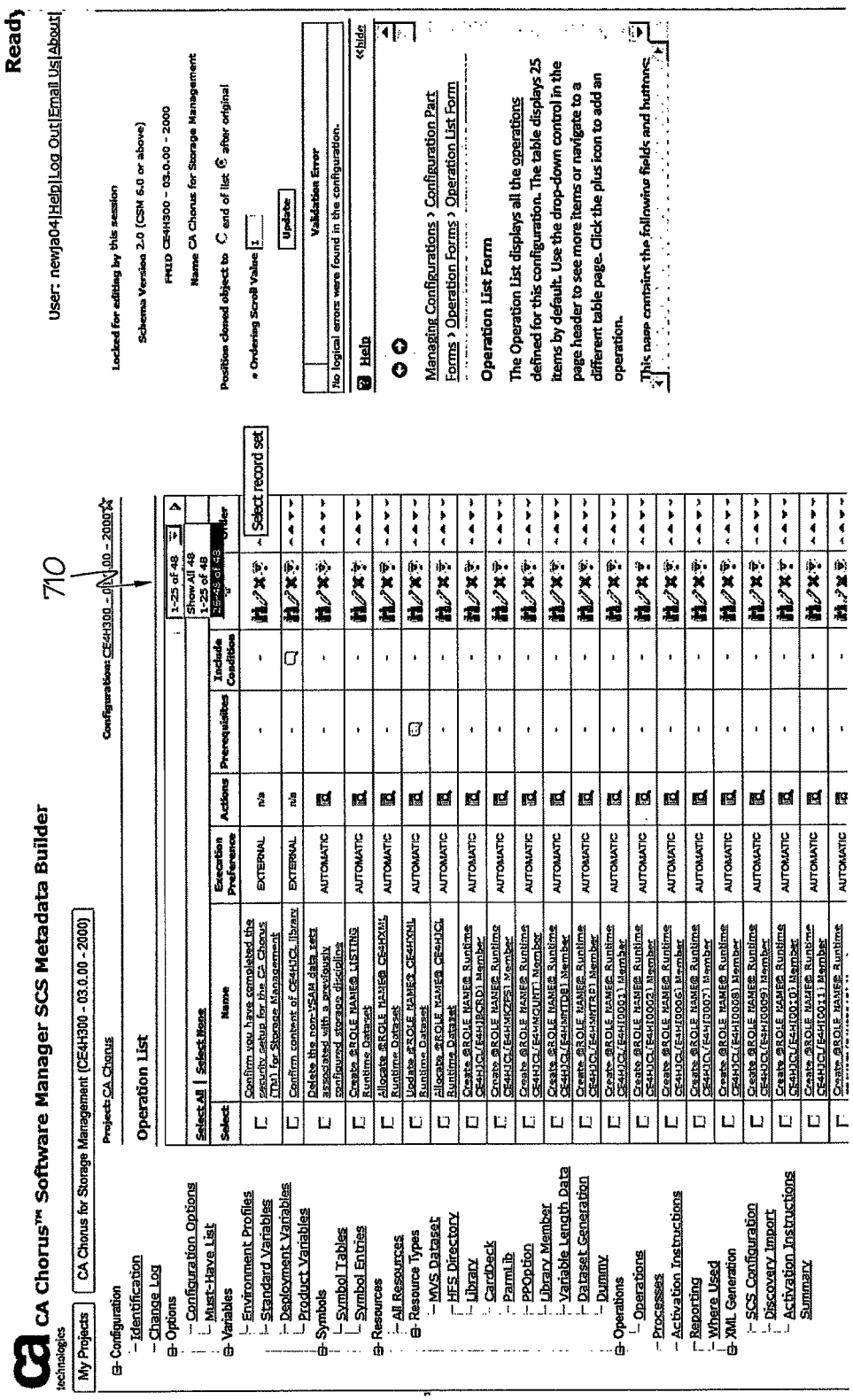

Selection of the add icon 526 in FIG. 5 can provide a record scroll list, which may be in the form of a drop down box 710 illustrated in FIG. 7B. The record select scroll list 710 shown in detail in FIG. 7B provides the user with a way to limit the number of lines they wish to display. This may be especially helpful when dealing with lists containing a large number of objects (e.g., lists that exceed 100 entries). Using the record select scroll list 710 can improve performance as only the items in the selected range may need to be processed by the user interface. Note the record select scroll list 710 is only present when display area 525 presents a list of objects.

Figures 8, 9:
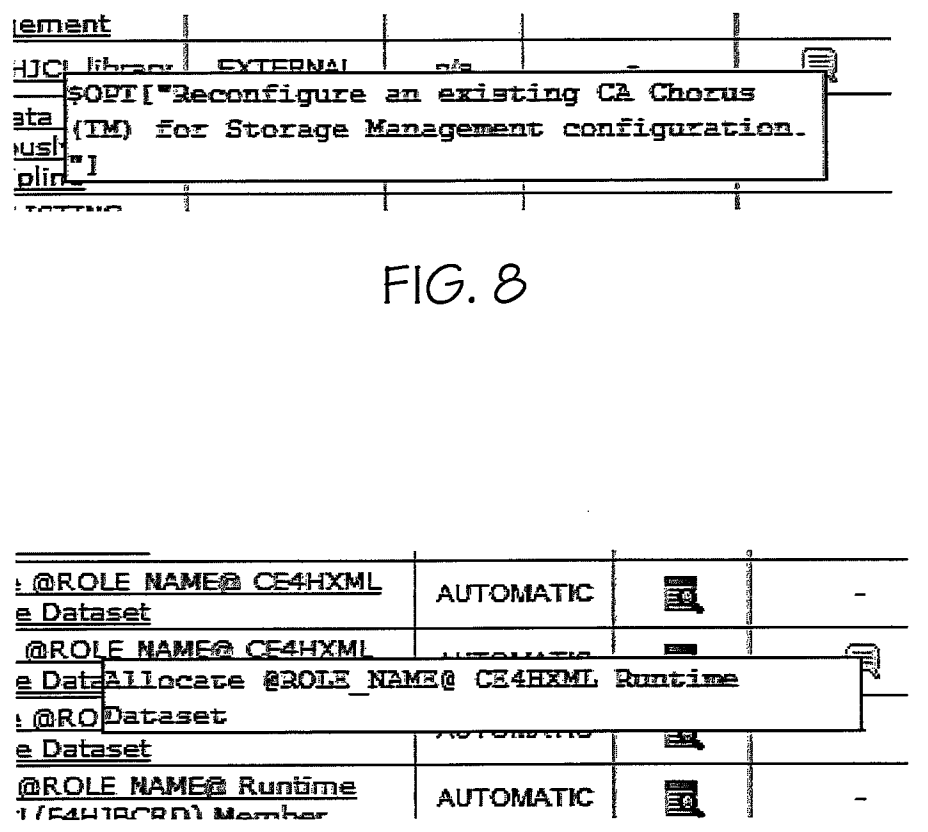

Returning to FIG. 5, at reference number 518, some of the listed objects also allow detailed information about object attributes to be displayed without going into an object's form. Thus, upon selection of the icon 518, these object attributes may be displayed in the form of pop-up tool tip boxes, as illustrated for example in FIGS. 8 and 9.

Figure 7C:
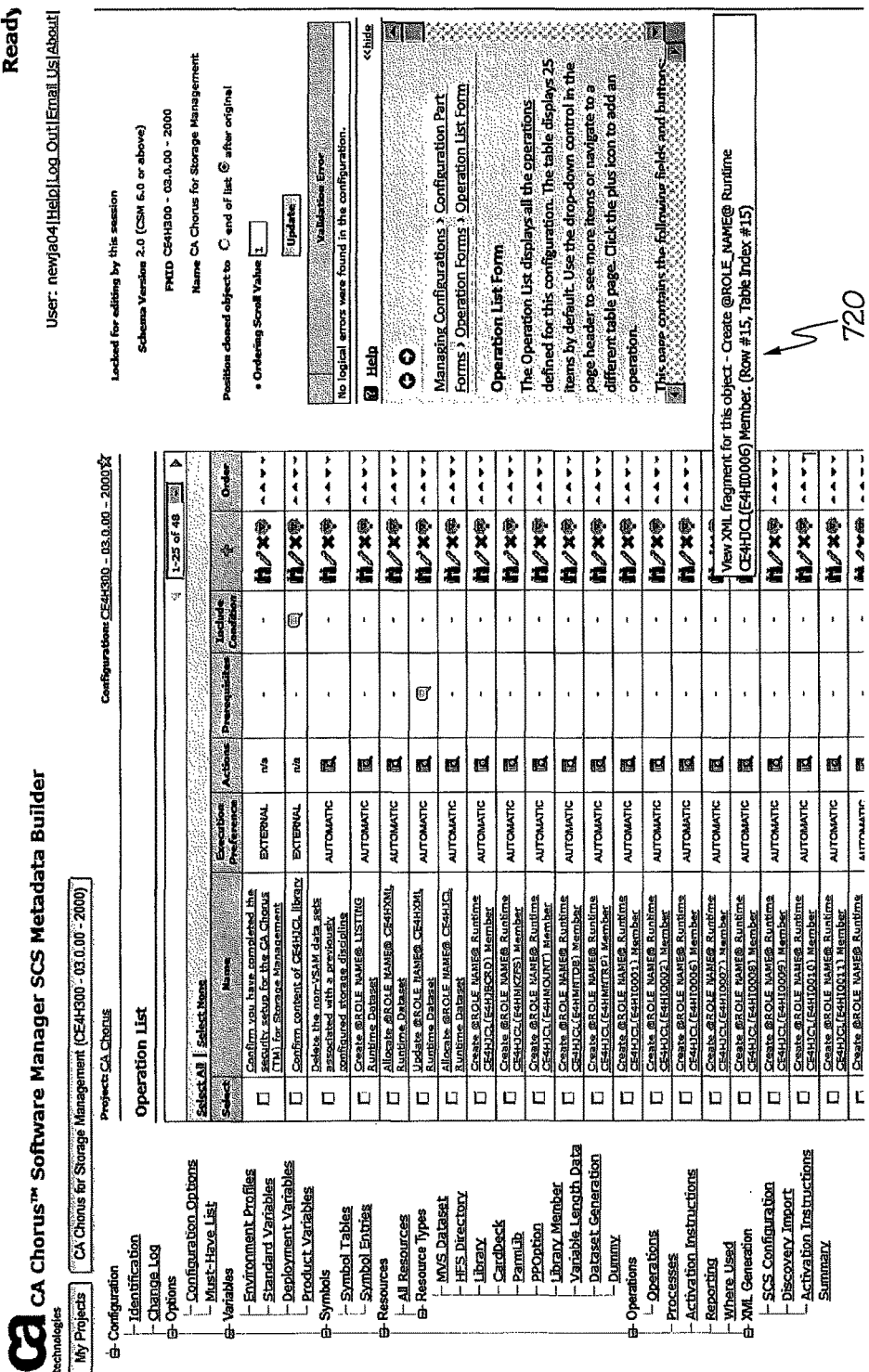

A binoculars icon 516 allows the user to view a formatted and color coded marshalled XML snippet of the MDB object in a pop-up window, without having to navigate away from the list, as was described in Block 450 of FIG. 4. An example of a pop-up window is illustrated in FIG. 7A. Hovering over the binoculars icon 516 will display a tooltip containing the name of the associated object and its row number in the list. An example of the tooltip 720 is shown in FIG. 7C.

Returning to FIG. 5, reference number 517 provides icons for "Edit" (a pencil), "Delete" (an X) or "Clone" (a sheep). Moreover, in other contexts, as will be described below, reference number 526 also may provide an icon for "Add" (a plus sign) to add or create a new metadata object. Accordingly, one of these icons 517 or 526 may be selected to initiate a change in the metadata, as was described at Block 320 of FIG. 3.

Figures 10, 11:
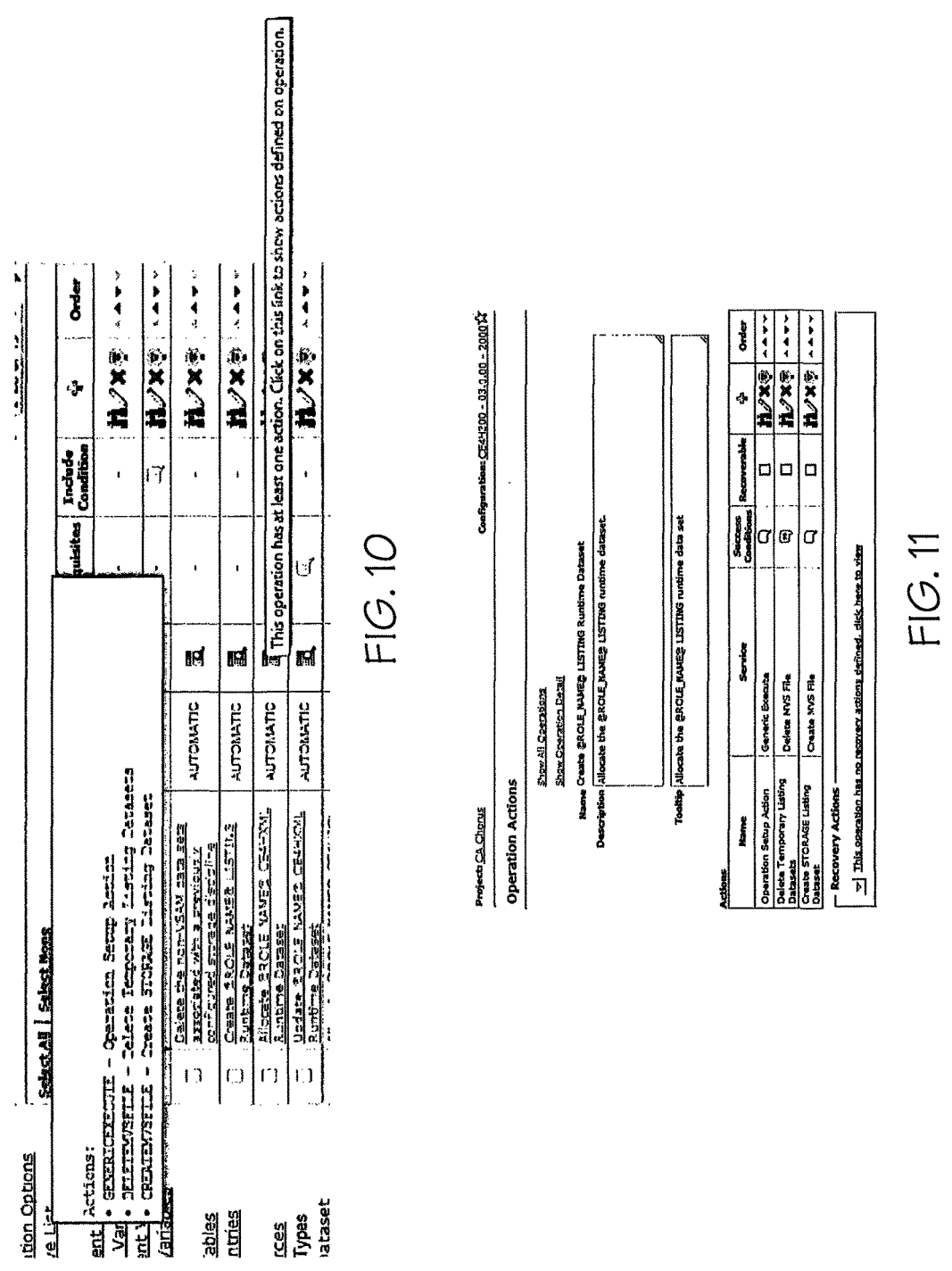

Referring back to FIG. 5, some metadata objects may be decomposed into many child objects as was described, for example, at Block 460 of FIG. 4A. Where this is the case, an icon 519 to view these child objects is displayed. For example, an operation object may be composed of many operation actions or components. Hovering over the icon 519 displays a quick list of the actions, as illustrated for example in FIG. 10. Alternatively, clicking on the icon 519 displays the actions themselves, as illustrated for example in FIG. 11.

The check boxes 520 allow one or more list elements to be selected for a group operation, such as ordering (as was described above) or deleting. The ordering column 521 allows a current row or a group of rows to be moved to other positions in the list. The selected items can also be quick placed before or after a row, or to the top or bottom, using the appropriate icon in the ordering column 521. Icon 522 can provide "tool tip information" about a component by clicking on the bubble.

Figure 12:
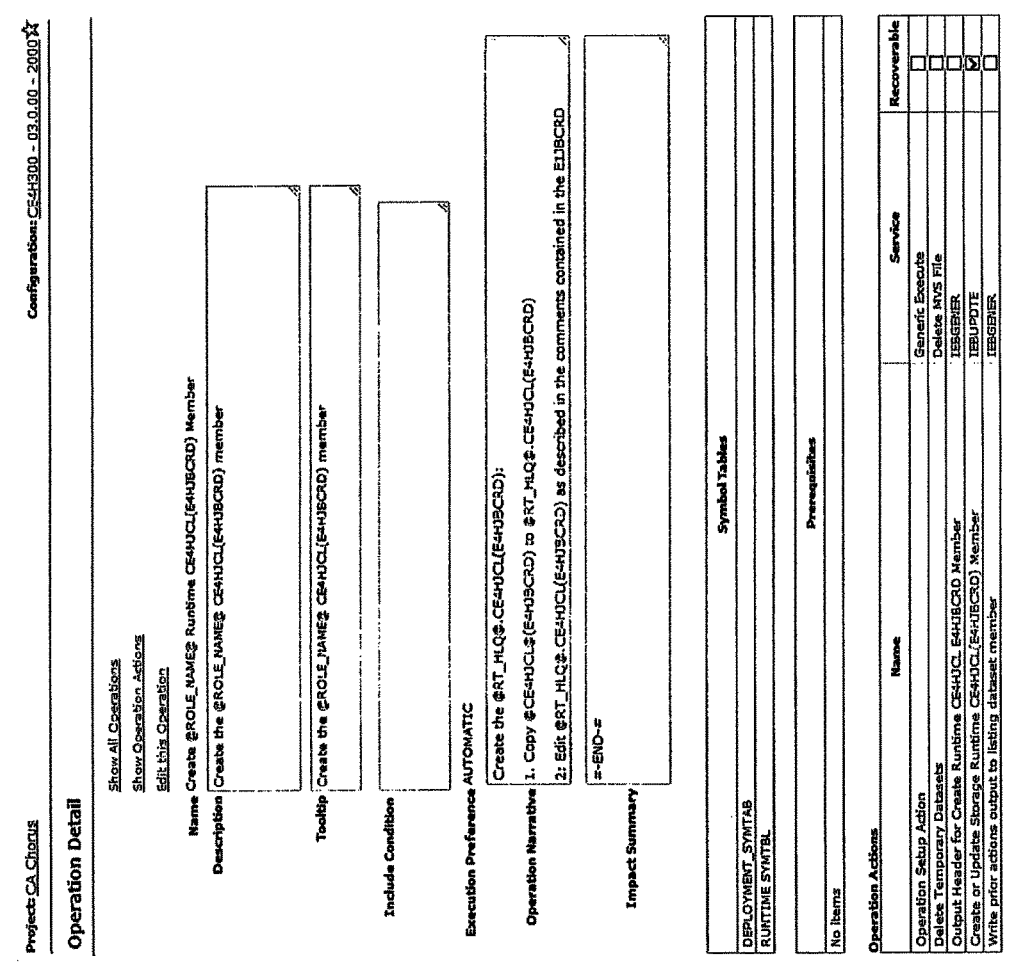

Finally, by clicking on a link to an individual object, as illustrated at 523, the user may be transferred to a read-only detailed information page about the listed object. One example is shown in FIG. 12. From this screen, the user can choose to edit or to return to the list. Other options may be presented depending on the object. Accordingly, reference number 523 provides a link for displaying details of a given object, as was described for example in connection with Block 430 of FIG. 4A. The details may include, for example, prerequisites and child object(s).

Another example will now be provided to illustrate adding objects to a configuration. This example may correspond to embodiments of FIG. 4B. This example uses an edit screen or form, where objects are created and edited. The form may replace the list 525 of FIG. 5 on the image of the display screen shown in FIG. 5. The edit screens or forms may be presented and used in a consistent manner. First, the edit screen or form may be displayed and user data is entered. The user data may be validated, for example at the client side, to detect missing fields and/or erroneously entered data. In addition, logical and/or schema validation of the object that is being edited or created may be performed, to identify errors in the object. In some embodiments, if an error is encountered via client or server side validation of a metadata object, then saving the object to the configuration may not be allowed. Errors may be displayed on the form in a message area, for example at the top of the form or in-line, for example next to the offending field. Moreover, once the new/edited object is saved, the new configuration is evaluated and schema or logical errors may be added or deleted from the right side of the screen at 512 of FIG. 5, for example by deleting an error from the list of errors that displayed at 512 of FIG. 5, and/or by adding an error to the list of errors that is displayed at 512 of FIG. 5. Note that an object will not be blocked from being saved if it contains one or more warning messages.

The following example will illustrate the creation of a Product Variable Group (PVG) and a Product Variable (PV) that is a child of the PVG, pursuant to embodiments of FIG. 4B.

Figure 13:
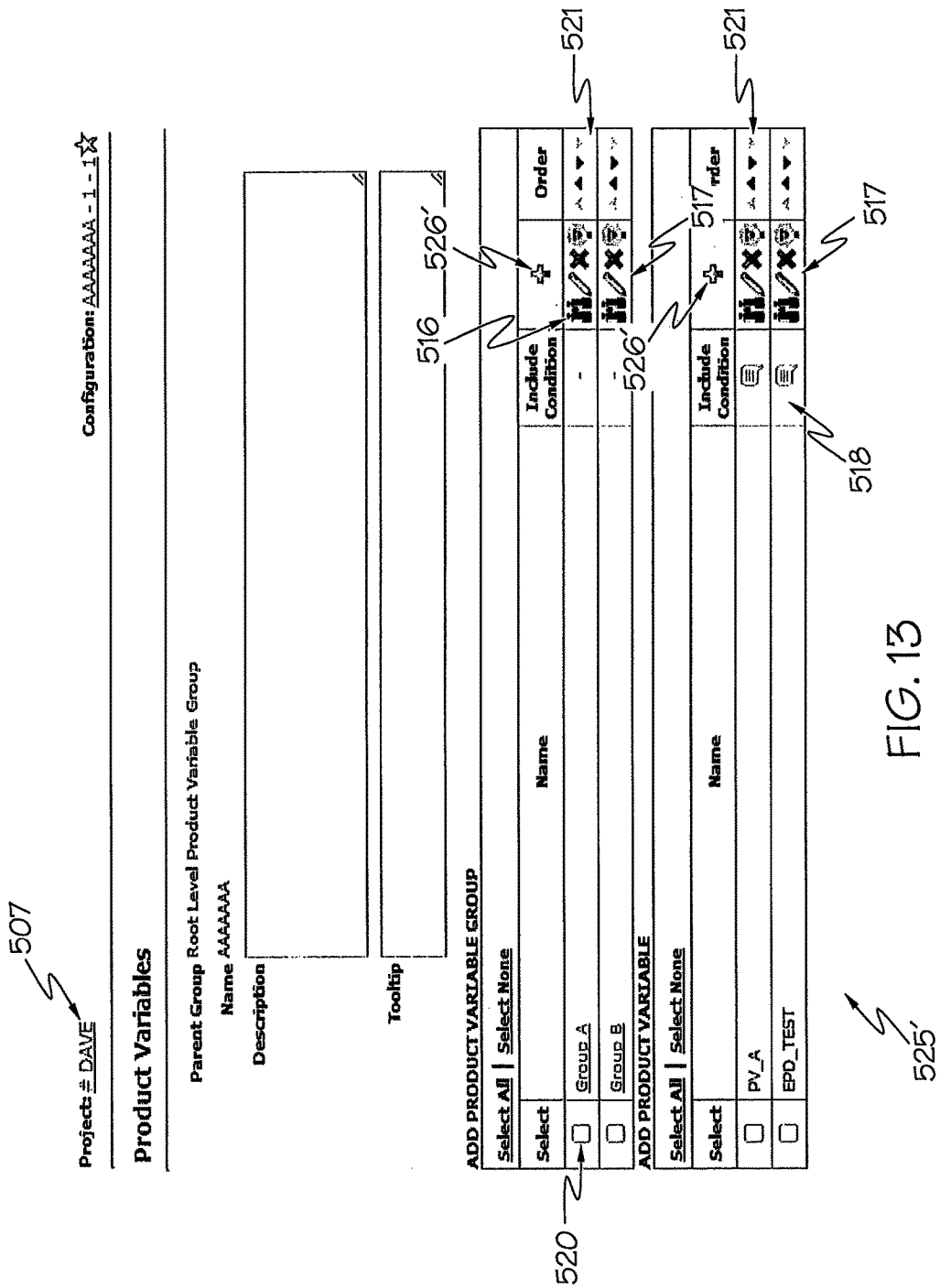

FIG. 13 is a screen shot of a display on the image on the display screen, of a list of the metadata objects for a given node among the nodes of the hierarchical tree, responsive to receiving a selection of the given node, as described for example at Block 420 of FIG. 4A. The list 525' of FIG. 13 for product variables may correspond to the list 525 of FIG. 5 for operations. The list 525' may be displayed on the image of the display screen that was illustrated in FIG. 5, in response to selection of the "product variables" node in the hierarchical listing 515 of FIG. 5.

In order to add a new PVG, the user clicks on the plus icon 526' for the "add product variable group" list. Note that the plus sign icon in both FIGS. 5 and 13 can add objects, but depending on what object is shown in 525, that type of object will be caused to be added. Also note that on FIG. 13, there are two icons 526'. In this case, the top icon 526' causes a PVG to be added, while the lower icon 526' will cause a PV to be added. The icon 526 shown in FIG. 5 would add an operation.

In response to the user clicking on the top plus icon 526' in FIG. 13, an empty form is displayed, as illustrated in FIG. 14. The empty form of FIG. 14 will replace the list 525' of FIG. 13. Thus, FIGS. 13 and 14 provide an embodiment of Block 435 of FIG. 4B. As shown in FIG. 15, fields are marked, for example with a dot, to indicate required fields. Selecting the save button can activate client side and server side validation. FIG. 15 shows the error messages that are displayed as a result of client side validation, informing the user that required entries are missing.

The "Include Condition" field may use a different type of client side validation. Specifically, each user keystroke may be validated and compared against a cached list of values. The include condition must conform to a strict pattern, and thus may be validated on the fly. The value of text that is erroneously entered in FIG. 15 does not conform to any such pattern, so the entire field may be highlighted as an error. For example, the background of the data entry field may be changed from its normal fill color to use a noticeably different fill color (e.g., normal fill being white, error fill being red). Specifically, as illustrated in FIG. 16, certain keystrokes are interpreted and acted upon by client side validation. For example, as shown in FIG. 16, the entry of a "$" instructs the client to display a list of valid and previously entered include conditions that begin with a "$". These are displayed in a drop-down box, as shown in FIG. 16, and can be used for reference or selected by clicking, which will populate the field with the selected value. FIG. 17 is a screen shot which shows the include condition being populated with a selected value from FIG. 16. The client validator considers it to be a valid pattern, so the error highlighting is removed. Accordingly, FIGS. 15-17 illustrate various embodiments of the operations of Block 330' of FIG. 4B.

The user may now attempt to save the PVG from the form of FIG. 17, so that a validation request may be sent to the server. The specific logical validator for the PVG then can examine the data content and decide that the details of the include condition do not match the necessary rules for a valid PVG of this type. As shown in FIG. 18, an error message (PV00033) is displayed to the user, control is returned to the UI, and the user must change the details. Moreover, the client has examined all the required fields and finds them populated, so any other errors are removed. Accordingly, FIG. 18 illustrates another embodiment of the operations of Block 330'.

Figures 19, 20:
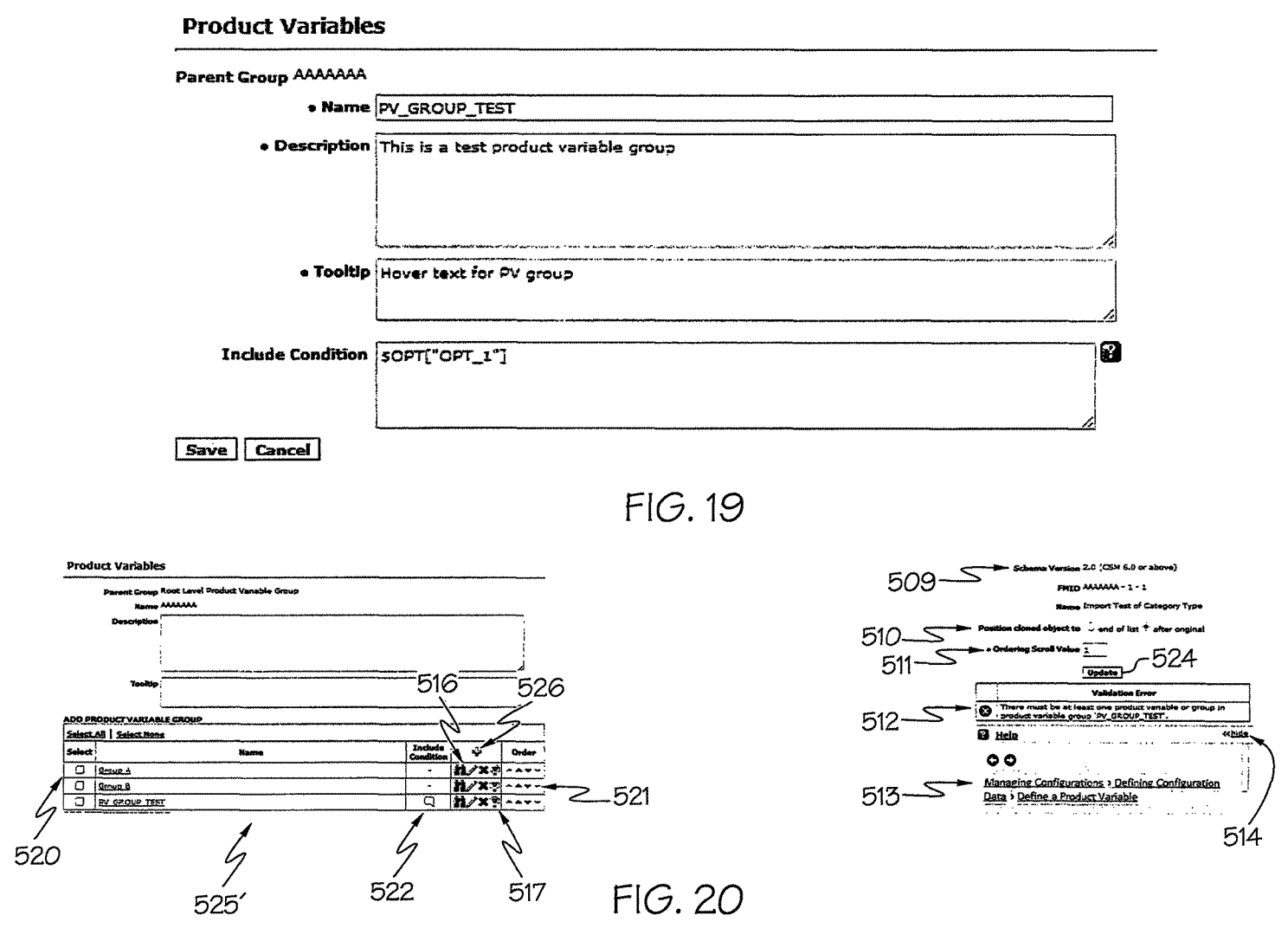

In FIG. 19, the user reenters the include condition with a different value and selects "save". Assuming the updates made are valid, the PVG is then created. Unfortunately, however, the PVG that was created in FIG. 19 may cause the configuration to fail schema validation, and the added error message is placed at the right side of the display of FIG. 5, as illustrated by 512 in FIG. 20. Specifically, a PVG must contain at least one child PVG or PV. This condition may not be known when the PVG was being created. Thus, the user must take action to remove this error condition that is displayed at 512 of FIG. 20. With this error, the configuration is not valid and cannot be saved or uploaded to a mainframe for deployment. Accordingly, FIG. 20 illustrates an embodiment of Block 340' of FIG. 4B.

Figure 21:
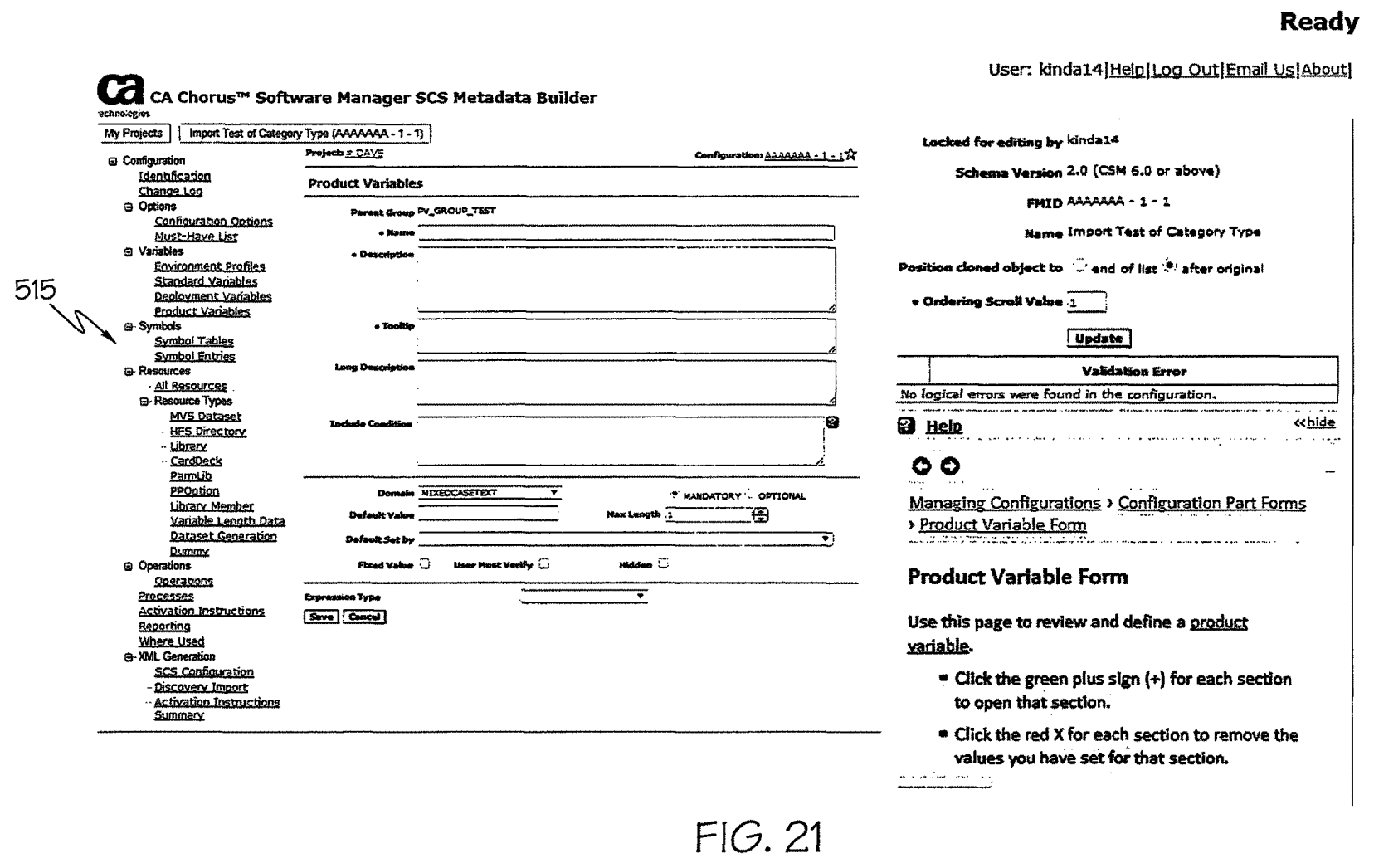

To rectify the schema error, the user can create a PV, as illustrated in FIG. 21, by again selecting product variables from the hierarchy 515. The product variable form of FIG. 14 is displayed adjacent the hierarchy, instead of a list 525. At FIG. 22, once all required fields are entered, "Save" may be clicked, similar to what was shown in FIG. 16 for the product variable group. Erroneous text is entered in the include condition field. Here, however, although an error is indicated, the user may hit "Save" anyway. The server side logical validator examines the content and finds it to be an error, so an error message is generated and returned to the UI with the field and error noted, as illustrated in FIG. 22. In FIG. 23, a different previously entered syntactically correct include condition is entered, and the save is attempted again. However, the content is examined and found to be logically incorrect for this object type, so that an error message is still displayed in FIG. 23. Operations then proceed for the product variable in the same manner that was described above for the product variable group.

Figures 24A, 24B:
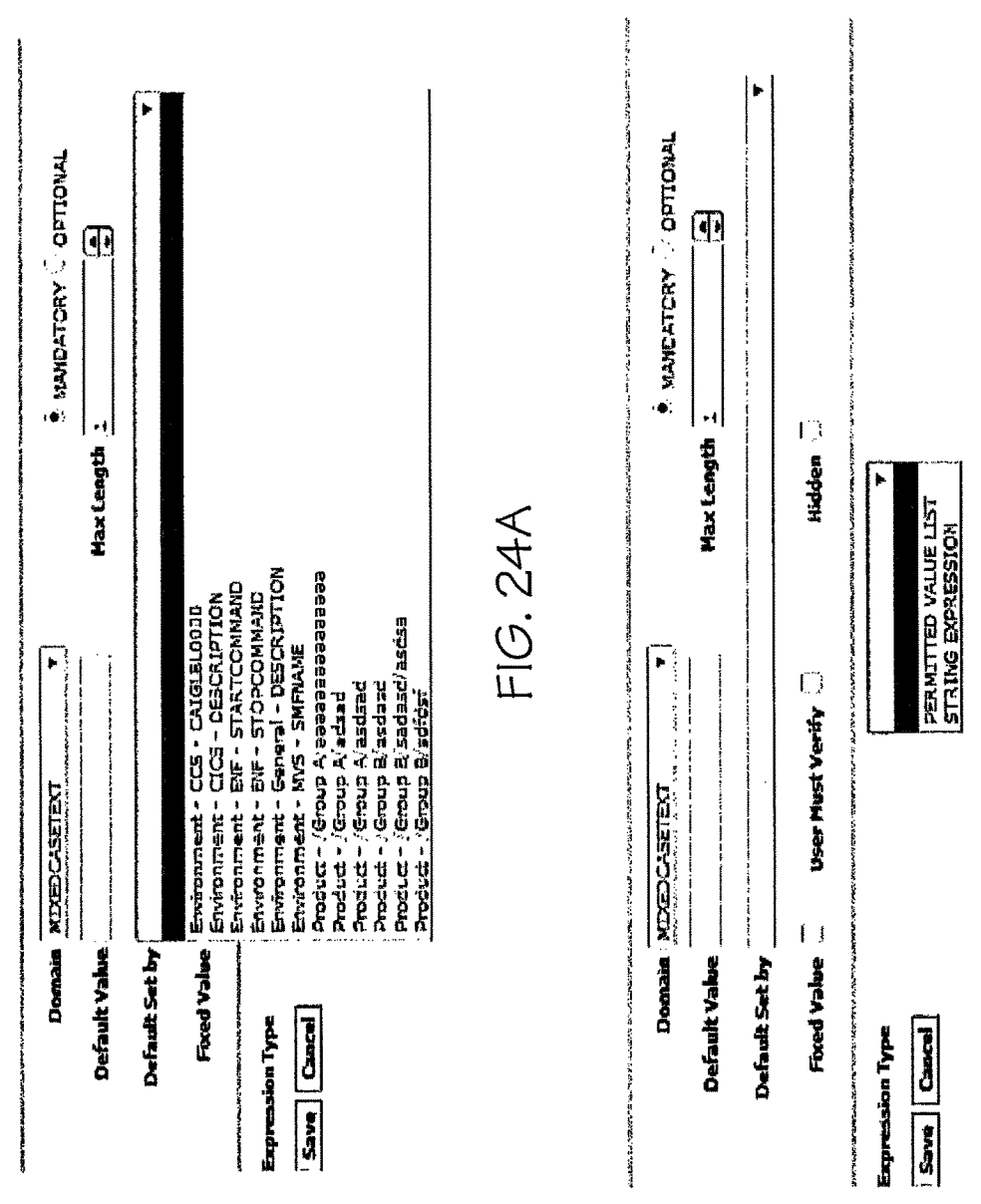

FIGS. 24A-29 illustrate examples of various forms according to various other embodiments described herein. Specifically, the contents of a form may be dynamic, meaning components that are displayed in the form can be added or removed according to selected values. Pre-populated values are also content-dependent. For example, as shown in FIG. 24A, a domain type of MIXEDCASETEXT has a maximum length of 1 pre-populated. Thus, a list of defaults is set by values in a drop-down box (FIG. 24A) and the two displayed expression types (FIG. 24B).

Figure 25A:
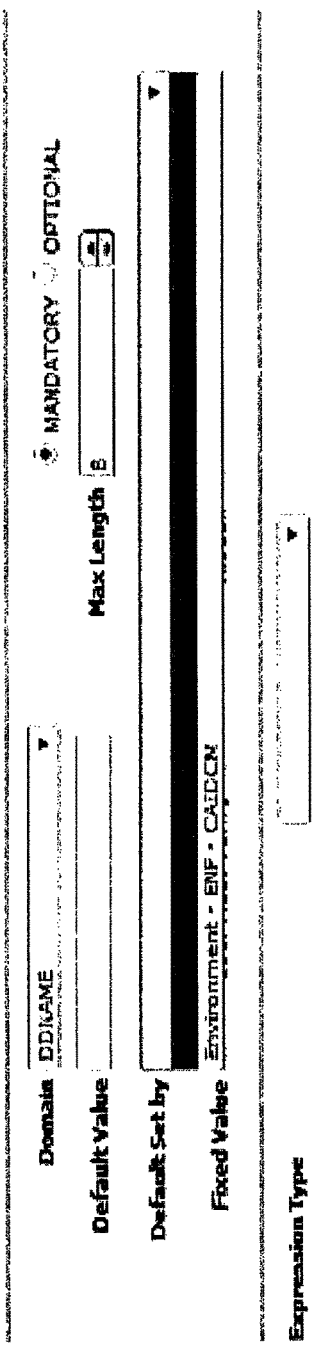
Figure 25B:
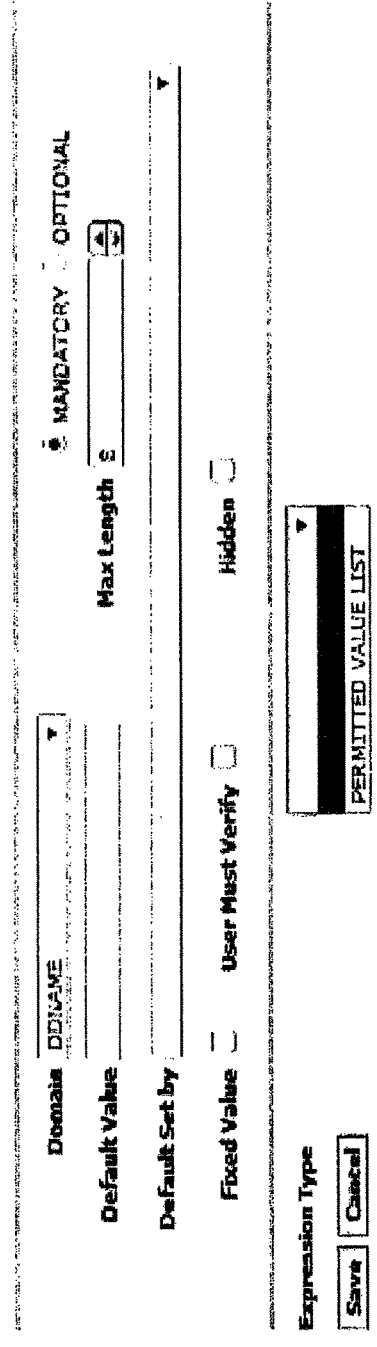

If a domain of DDNAME is selected, the max length is now 8, and the default set by and expression type values are updated to reflect the domain type, as illustrated in FIGS. 25A and 25B.

The validation of the form content may also be changed, as can be seen in FIG. 26. Thus, if the user inputs a default value greater than the maximum length, a logical error is displayed.

Figure 27:
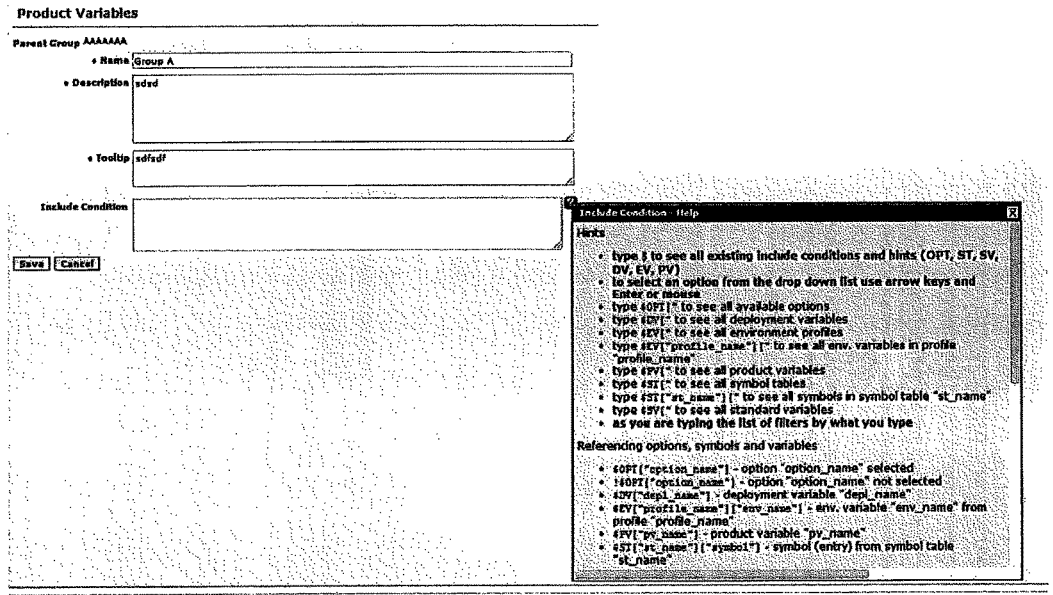
Figure 28:
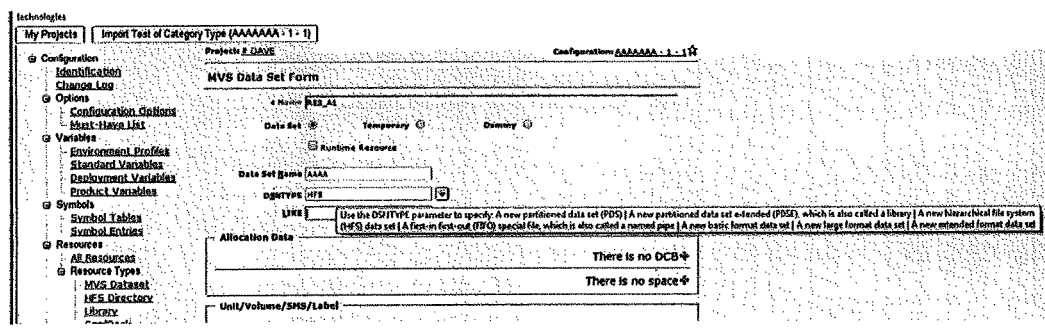

In-line help specific to a particular form field may also be available for selected components by clicking on the question mark to the right of the component. The result may be displayed as a pop-up, as shown in FIG. 27. Hovering over components can also trigger some information text, which may help the user in entering the correct data without waiting for a validation error, as shown in FIG. 28. There may also be mandatory warnings displayed when focus for a component is activated, as shown in FIG. 29. This warning text may have a set time limit, after which the pop-up may be faded.

Figure 30:
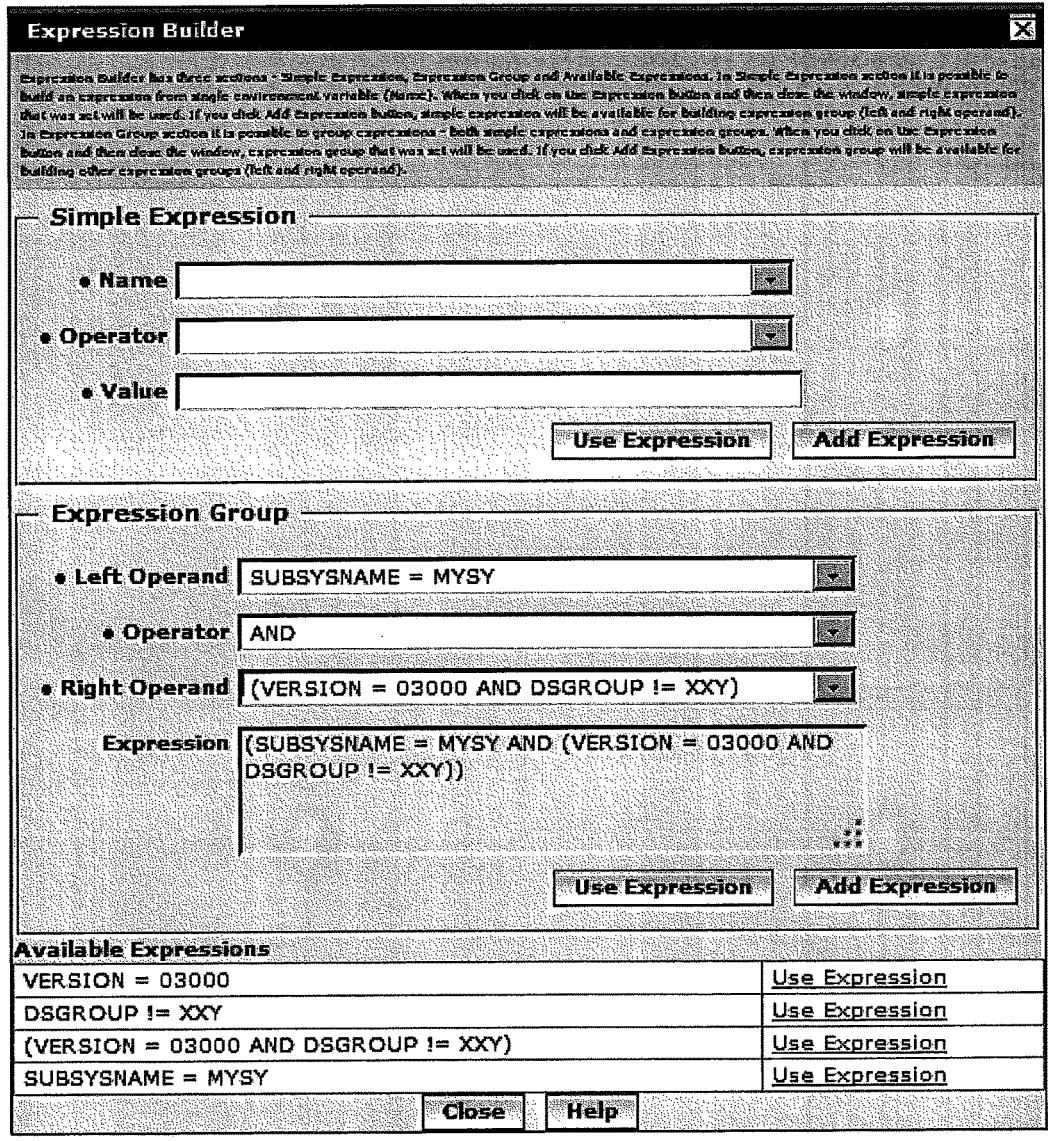
Figure 31:
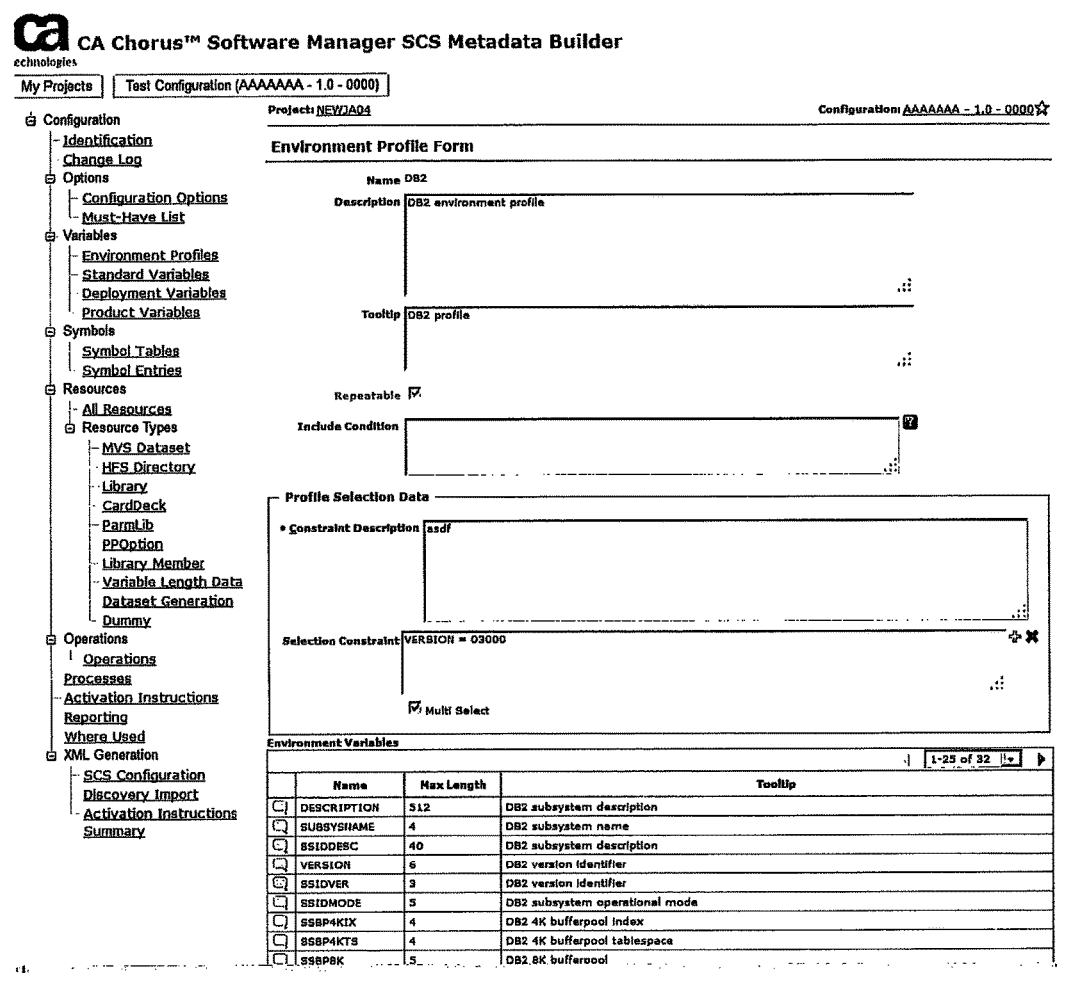

FIGS. 30 and 31 illustrate an example of an expression builder according to various embodiments described herein. The expression builder may be used to define selection constraints for repeated environment variables. The expression builder allows compound expressions to be constructed by allowing single expressions to be built, then allowing those expressions being combined into an expression group. See FIG. 30. Note that the resulting compound expression is displayed complete with the necessary parenthesis needed to ensure the order evaluation is defined as intended by the user.

The expression builder of FIG. 30 may be launched from a repeated environment profile form that is illustrated in FIG. 31. FIG. 31 shows the DB2 environment profile. The environment profile form of FIG. 31 is presented when adding a repeated profile to a configuration definition. The user would use the environment profiles link on the left side to show the list of environment profiles currently associated with the configuration definition. Additionally, it provides the list of additional environment profile definition from which to choose. When adding a repeated profile, for example DB2, the form of FIG. 31 includes the profile selection data section. The expression builder of FIG. 30 is launched by clicking the plus sign icon associated with the selection constraint entry field. Specifying a selection constraint may be optional. If no selection constraint is specified, all occurrences of the profile are considered eligible for use by the product being configured. When specified, the selection constraint defines the conditions under which a defined occurrences of the repeated profile are included in the list of occurrences presented by CSM during the configuration of the product. For example, certain products may require a certain version of DB2. Specifying selection constraints can eliminate DB2 versions that do not apply and should not be presented in the list of selectable occurrences.

Embodiments of the present disclosure were described herein with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method of operating a computer system comprising:
    displaying on an image on a display screen, a list of errors in metadata for a computer program, the list of errors generated based on an evaluation of the metadata;
    receiving user input for correcting a first error of a first type in a first validation area of the image on the display screen and user input for correcting a second error of a second type in a second validation area of the image on the display screen that does not overlap the first validation area;
    to prevent errors from being added to the computer program, validating the user input for correcting the first error on an on-the-fly basis, wherein validating the user input for correcting the first error on the on-the-fly basis comprises:
        comparing each keystroke of the user input against a cached list of values and responsive to the user input not being a value in the cached list of values:
            providing an indication that the user input does not conform to any value in the cached list of values; and
            responsive to receiving user input that conforms to a value in the cached list of values, removing the indication responsive to the user input conforming to a value in the cached list of values;
    validating the user input for correcting the second error responsive to receiving an indication of a user command to validate the user input for correcting the second error, wherein validating the user input for correcting the second error comprises:
        transmitting the user input for correcting the second error from a user interface of the computer system through a network to a server component for validation;
        responsive to the user input for correcting the second error being valid, receiving a response from the server component that includes an indication of user input for correcting the second error being valid; and
        responsive to the user input for correcting the second error being invalid, receiving a response from the server component that includes a logical validation error and/or a schema validation error that must be corrected before the computer program can be saved to the server component for deployment of the computer program;
    changing the list of errors that is displayed on the image on the display screen, responsive to the receiving, the validating the user input for correcting the first error, and validating the user input for correcting the second error;
    repeating the receiving, validating the user input for correcting the first error, validating the user input for correcting the second error, and changing operations until there are no more errors in the list of errors; and
    transmitting the metadata for the program to the server component for one of: storage and deployment of the computer program.

2. The method according to claim 1 wherein the changing comprises:
    adding an error to the list of errors that is displayed on the image on the display screen responsive to the receiving and the validating of the user input for correcting the first error and the user input for correcting the second error and/or deleting an error from the list of errors that is displayed on the image on the display screen responsive to the receiving and the validating of the user input for correcting the first error and the user input for correcting the second error.

3. The method according to claim 2 wherein the metadata comprises metadata objects and wherein the displaying further comprises:
    displaying on the image on the display screen, a hierarchical tree of the metadata objects including nodes that represent classes of metadata objects; and
    displaying on the image on the display screen a list of the metadata objects for a given node among the nodes of the hierarchical tree responsive to receiving a selection of the given node.

4. The method according to claim 3 wherein the displaying further comprises:
    displaying details of a given metadata object among the metadata objects responsive to receiving a selection of the given metadata object.

5. The method according to claim 4 wherein the displaying details of a given metadata object among the metadata objects responsive to receiving a selection of the given metadata object comprises replacing the list of the metadata objects for the given node of the hierarchical tree with a form on the image on the display screen that comprises the details of the given metadata object responsive to receiving the selection of the given metadata object.

6. The method according to claim 3 further comprising reordering the list of the metadata objects for the given node responsive to receiving a reordering instruction.

7. The method according to claim 6 wherein the reordering comprises moving a group of the metadata objects in the list responsive to receiving a selection of the group of the metadata objects and further responsive to receiving the reordering instruction.

8. The method according to claim 3 further comprising:
displaying an XML fragment of a given metadata object among the metadata objects in a pop up window on the image on the display screen responsive to receiving a selection of the given metadata object.

9. The method according to claim 3 further comprising:
replacing the list of the metadata objects for the given node among the nodes of the hierarchical tree with a form for editing a given metadata object among the metadata objects, deleting a given metadata object among the metadata objects and/or cloning a given metadata object among the metadata objects, responsive to receiving selection of the given metadata object on the list of the metadata objects for editing, deleting and/or cloning, respectively.

10. The method according to claim 3 further comprising:
replacing the list of the metadata objects for the given node among the nodes of the hierarchical tree with a form for adding a new metadata object to the metadata objects, responsive to receiving a selection on the list of the metadata objects; and
processing a change of the metadata for the computer program received via the form.

11. The method according to claim 10 wherein the processing the change of the metadata for the computer system comprises:
identifying required fields that are missing from the form; and
identifying text that is erroneously entered on the form;
wherein the changing the list of errors comprises changing the list of errors that is displayed on the image on the display screen to delete errors in the metadata that are corrected by the new metadata object and/or to add errors in the metadata that are generated by the new metadata object.

12. The method according of claim 1 wherein displaying a list of errors in metadata for a computer program comprises:
displaying a list of logical validation errors that identify violations of referential integrity in the metadata; and
displaying a list of schema validation errors in the metadata that identify semantic and syntactic violations of the schema in the metadata.

13. The method according to claim 12 wherein displaying a list of errors in metadata for a computer program further comprises:
displaying a list of warnings about the metadata; and
displaying informational messages about the metadata.

14. The method according to claim 1:
wherein the metadata comprises metadata objects and wherein the displaying further comprises:
displaying on the image on the display screen, a hierarchical tree of the metadata objects including nodes that represent classes of the metadata objects;
displaying on the image on the display screen, a list of the metadata objects for a given node among the nodes of the hierarchical tree responsive to receiving a selection of the given node; and
displaying on the image of the display screen, a form for adding a new metadata object to the metadata objects, responsive to receiving a selection on the list of the metadata objects;
the method further comprising receiving data for the new metadata object via the form, and processing the data,
the processing the data comprises adding the new metadata object to the metadata for the computer program responsive to successful logical validation and schema validation of the new metadata object; and
wherein the changing the list of errors comprises adding an error in the metadata for the computer program that is generated by the new metadata object, to the list of errors that is displayed on the image on the display screen, and/or deleting an error in the metadata for the computer program that is corrected by the new metadata object, from the list of errors that is displayed on the image on the display screen, responsive to the adding the new metadata object to the metadata for the computer program.

15. The method according to claim 1:
wherein the metadata comprises metadata objects and wherein the displaying further comprises:
displaying on the image on the display screen, a hierarchical tree of the metadata objects including nodes that represent classes of the metadata objects;
displaying on the image on the display screen, a list of the metadata objects for a given node among the nodes of the hierarchical tree responsive to receiving a selection of the given node; and
displaying on the image of the display screen, a form for editing a given metadata object of the metadata objects to produce an edited metadata object, responsive to receiving a selection of the given metadata object from the list of the metadata objects;
the method further comprising receiving editing data for the given metadata object on the form and processing the editing data,
wherein the processing the editing data comprises replacing the given metadata object with the edited metadata object in the metadata for the computer program responsive to successful logical validation and schema validation of the edited metadata object; and
wherein the changing the list of errors comprises adding an error in the metadata for the computer program that is generated by the edited metadata object, to the list of errors that is displayed on the image on the display screen, and/or deleting an error in the metadata for the computer program that is corrected by the edited metadata object, from the list of errors that is displayed on the image on the display screen, responsive to the replacing the given metadata object with the edited metadata object in the metadata for the computer program.

16. The method of claim 1, wherein the user input comprises a plurality of characters and wherein validating the user input for correcting the first error on the on-the-fly basis comprises validating the user input on a character-by-character basis as each character is entered.

17. The method of claim 1 wherein the user command to validate the user input for the second error is a selection of a displayed button.

18. The method of claim 1, further comprising:
responsive to receiving an indication for providing help to the user on valid data input for a form field, providing information text in the second validation area of the image, the information text providing information on valid data input for the form field.

19. A computer system comprising:
a processor; and
an interactive user interface that runs on the processor and is configured to perform operations comprising:
  displaying a list of errors in metadata for a computer program, the list of errors generated based on an evaluation of the metadata;
  receiving user input for correcting a first error of a first type in a first validation area of the image on the display screen and user input for correcting a second error of a second type in a second validation area of the image on the display screen that does not overlap the first validation area;
  to prevent errors from being added to the computer program, validating the user input for correcting the first error on an on-the-fly basis, wherein validating the user input for correcting the first error on the on-the-fly basis comprises:
    comparing each keystroke of the user input against a cached list of values and responsive to the user input not being a value in the cached list of values:
      providing an indication that the user input does not conform to any value in the cached list of values; and
    responsive to receiving user input that conforms to a value in the cached list of values, removing the indication responsive to the user input conforming to a value in the cached list of values;
  validating the user input for correcting the second error responsive to receiving an indication of a user to validate the user input for correcting the second error, wherein validating the user input for correcting the second error comprises:
    transmitting the user input for correcting the second error from the interactive user interface through a network to a server component for validation;
    responsive to the user input for correcting the second error being valid, receiving a response from the server component that includes an indication of user input for correcting the second error being valid; and
    responsive to the user input for the second error being invalid, receiving a response from the server component that includes a logical validation error and/or a schema validation error that must be corrected before the computer program can be saved to the server component for deployment of the computer program;
  changing the list of errors that is displayed responsive to the receiving, the validating the user input for correcting the first error, and validating the user input for correcting the second error;
  repeating the receiving, validating the user input for correcting the first error, validating the user input for correcting the second error, and changing operations until there are no more errors in the list of errors; and
  transmitting the metadata for the program to the server component for one of: storage and deployment of the computer program.

20. The computer system according to claim 19 wherein the changing comprises:
  adding an error to the list of errors that is displayed responsive to the receiving and the validating of the user input for correcting the first error and the user input for correcting the second error and/or deleting an error from the list of errors that is displayed responsive to the receiving and the validating of the user input for correcting the first error and the user input for correcting the second error.

21. The computer system according to claim 20 wherein the metadata comprises metadata objects and wherein the displaying further comprises:
  displaying a hierarchical tree of the metadata objects including nodes that represent classes of metadata objects; and
  displaying a list of the metadata objects for a given node among the nodes of the hierarchical tree responsive to receiving a selection of the given node.

22. A computer program comprising:
a tangible computer readable storage medium comprising computer readable program code embodied in the medium that when executed by at least one processor of a computer system causes the computer system to perform operations comprising:
  displaying on an image on a display screen, a list of errors in metadata for a computer program, the list of errors generated based on an evaluation of the metadata;
  receiving user input for correcting a first error of a first type in a first validation area of the image on the display screen and user input for correcting a second error of a second type in a second validation area of the image on the display screen that does not overlap the first validation area;
  to prevent errors from being added to the computer program, validating the user input for correcting the first error on an on-the-fly basis, wherein validating the user input for correcting the first error on the on-the-fly basis comprises:
    comparing each keystroke of the user input against a cached list of values and responsive to the user input not being a value in the cached list of values:
      providing an indication that the user input does not conform to any value in the cached list of values; and
    responsive to receiving user input that conforms to a value in the cached list of values, removing the indication responsive to the user input conforming to a value in the cached list of values;
  validating the user input for correcting the second error responsive to receiving an indication of a user command to validate the user input for the second error, wherein validating the user input for the second error comprises:
    transmitting the user input for correcting the second error from a user interface of the computer system through a network to a server component for validation;
    responsive to the user input for the second error being valid, receiving a response from the server component that includes an indication of the user input for correcting the second error being valid; and
    responsive to the user input for correcting the second error being invalid, receiving a response from the server component that includes a logical validation error and/or a schema validation error that must be corrected before the computer program can be saved to the server component for deployment of the computer program;
  changing the list of errors that is displayed on the image on the display screen, responsive to the receiving;

the validating the user input for correcting the first error, and validating the user input for correcting the second error;
repeating the receiving, validating the user input for correcting the first error, validating the user input for correcting the second error, and changing operations until there are no more errors in the list of errors; and
transmitting the metadata for the program to the server component for one of: storage and deployment of the computer program.

* * * * *